US00RE34483E

United States Patent [19]

Bowman et al.

[11] E Patent Number: Re. 34,483

[45] Reissued Date of Patent: Dec. 21, 1993

[54] PROCESSING PAPER AND OTHER WEBS

[75] Inventors: Kenneth A. Bowman, Hanham; Roger F. Maslin, Downend; David Godden, Pill; Jonathan H. Ripper, Weston, all of England

[73] Assignee: Strachan Henshaw Machinery Limited, United Kingdom

[21] Appl. No.: 870,267

[22] Filed: Apr. 17, 1992

Related U.S. Patent Documents

Reissue of:

[64] Patent No.: 4,831,926
Issued: May 23, 1989
Appl. No.: 49,801
Filed: May 14, 1987

[51] Int. Cl.[5] ..... B41F 9/02

[52] U.S. Cl. ..... 101/138; 101/152; 101/181; 101/247; 101/352

[58] Field of Search ..... 270/21.1; 101/451, 152, 101/352, 186, 181, 182, 136, 216, 328, 220, 221, 247

[56] References Cited

U.S. PATENT DOCUMENTS

| | | | |
|---|---|---|---|
| Re. 10,330 | 5/1883 | Hinds | 101/181 |
| 374,930 | 12/1887 | Brooks . | |
| 1,160,444 | 11/1915 | Parker | 101/221 |
| 1,963,042 | 6/1934 | Avery | 101/181 |
| 2,146,586 | 2/1939 | Meisel | 101/182 |
| 2,149,028 | 2/1939 | Meisel | 101/181 |
| 2,216,562 | 10/1940 | Barber | 101/220 |
| 3,404,626 | 10/1968 | White et al. | 101/177 |
| 3,601,049 | 8/1971 | Hamilton | 101/352 |
| 3,604,350 | 9/1971 | Rosenstadt | 101/181 |
| 3,734,014 | 5/1973 | Oda | 101/186 |
| 3,793,952 | 2/1974 | Neumann et al. | 101/247 |
| 3,851,582 | 12/1974 | Saueresig et al. | 101/352 |
| 3,859,883 | 1/1975 | Basset et al. | 83/544 |
| 3,892,178 | 7/1975 | Staamann | 101/181 |
| 4,057,012 | 11/1977 | Heidemann | 101/247 |
| 4,141,293 | 2/1979 | Corse | 101/181 |
| 4,437,402 | 3/1984 | Fischer | 101/181 |
| 4,462,311 | 7/1984 | Armelian | 101/247 |
| 4,526,099 | 7/1985 | Niemiro et al. | 101/220 |
| 4,530,282 | 7/1985 | Schulz | 101/181 |
| 4,564,470 | 1/1986 | Schmitt | 270/21.1 |
| 4,598,640 | 7/1986 | Nawrath | 101/177 |

FOREIGN PATENT DOCUMENTS

| | | | |
|---|---|---|---|
| 51301/85 | 12/1985 | Australia . | |
| 0113601 | 7/1984 | European Pat. Off. . | |
| 563187 | 11/1932 | Fed. Rep. of Germany . | |
| 2053803 | 5/1971 | Fed. Rep. of Germany . | |
| 2033836 | 1/1972 | Fed. Rep. of Germany . | |
| 2121700 | 4/1980 | Fed. Rep. of Germany . | |
| 3412812 | 6/1985 | Fed. Rep. of Germany . | |
| 3520965 | 12/1986 | Fed. Rep. of Germany . | |
| 3702327 | 8/1988 | Fed. Rep. of Germany . | |
| 167895 | 2/1965 | U.S.S.R. . | |
| 1065511 | 4/1967 | United Kingdom . | |
| 1093729 | 12/1967 | United Kingdom . | |
| 1245204 | 9/1971 | United Kingdom . | |
| 1288360 | 9/1972 | United Kingdom . | |
| 1352712 | 5/1974 | United Kingdom . | |
| 1389624 | 4/1975 | United Kingdom . | |
| 2015431 | 9/1979 | United Kingdom . | |
| 1589266 | 5/1981 | United Kingdom | 101/181 |
| 2111912 | 7/1983 | United Kingdom | 101/181 |

OTHER PUBLICATIONS

DE-Z "Druck Print" Jan. 1985, Seite 19.

*Primary Examiner*—Eugene H. Eickholt
*Attorney, Agent, or Firm*—Larson and Taylor

[57] ABSTRACT

A printing apparatus has an array of cartridges for printing a web of e.g. paper passing through the array, and one or more units containing printing medium. The cartridges each are capable of transferring the printing medium from the unit(s) to the web. The unit(s) and the cartridges of the array are relatively movable, to allow the unit(s) to interact successively with at least two of the cartridges. In this way it is possible to change printing from one cartridge to another, allowing changes to be made to what is printed, without halting the movement of web significantly. The present invention also proposes that the cartridges may have printing cylinders of different sizes, and furthermore that a mobile unwind stand may be used to move web material to the printing apparatus, and the web output from the printing apparatus processed by sheet folding techniques.

26 Claims, 13 Drawing Sheets

PROCESSING PAPER AND OTHER WEBS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to web processing systems, which may perform operations such as forming an image on a web (e.g. of paper) by printing, copying or other marking process, (hereinafter generally referred to as "printing") and/or handling arrangements such as folding or format adjustment. The present invention is particularly, but not exclusively, concerned with processing systems in which the paper or other material orginates as a continuous web on a roll.

2. Summary of the Prior Art

It is very well known to pass paper from a roll through a printing machine to form a series of images on it and then rewind, sheet or fold it into various formats. However, there are fundamental problems which provide a serious limitation to the efficiency of such machines. There is the problem of "down-time". Once the printing machine has been sep up, and the paper put in motion, printing can occur very rapidly. However, with the known machines long delays can occur when any change is made to the method of delivery or to what is being printed. For example, if a different image is to be printed, or if the repeat length of the image is to be changed, or if a different colour is to be used, or the folded format is to be changed, then the print run has to be stopped. The design of the known printing machines is such that it is extremely difficult to make such changes, and hence it is common for the time such machines are not working (the down-time) to be much longer than the effective working time.

A further problem of existing arrangements is that printing machines are designed for a specific printing application, the machine being available as a single entity. What this means, in practice, is that if the owner of the machine wants to carry out more complex operations than are currently possible on his machine, he must undertake quite major engineering or buy a whole new machine.

SUMMARY OF THE INVENTION

The present invention is therefore concerned with overcoming, or at least ameliorating, these problems to design a web processing system in which many changes can be made whilst the system is in operation (can be made "on the fly") and which may also have the advantage of being modular so that the system may be expanded in capability if required.

The web processing system with which the present invention is concerned may be divided into three parts. Firstly, there is the part of the system which takes the web from a roll or reel and feeds it to the rest of the system. Secondly, there is the part which forms an image on the web, and thirdly there is a handling arrangement for the printed web. The present invention has several aspects, each concerned with various parts of such a system.

The first aspect is concerned with the handling of rolls and the input of a web to a printing machine or other imaging apparatus. When webs are input into a printing machine, problems occur at the end of the web. If the machine is not to be stopped, then some splicing arrangement is necessary to attach the end of one web to the beginning of the next. There are two known systems for achieving this. Firstly, there is a system known as a "flying splice" in which joining is carried out with the surface of the new roll moving at the same speed as the running web. The second system is known as a "zero-speed splice" in which the join is effected while both the new roll and the running web are stationary but the press is kept running by means of a reservoir of web such as a festoon.

The first aspect of the present invention seeks to improve the efficiency of the roll handling and the splicing system. In its most general form, this aspect moves rolls of web material on suitable supports, e.g. mobile unwind stands relative to a splicer of a web processing apparatus. With one roll of web material being drawn into the web processing apparatus, another web we may be brought up the splicer, the two webs spliced together, and the web from the second roll drawn into the machine. Splicing may be achieved by flying or zero-speed splicing.

Thus according to this aspect, there may be provided a method of feeding web material to a web processing apparatus, the method comprising, moving, relative to a splicing position, a first reel of the web material from an initial position of that reel towards a final position for that reel; withdrawing web material from the first reel into the web processing apparatus; moving, relative to the splicing position, a second reel of the web material from an initial position of that second reel to a final position for that reel; splicing the web material of the first reel to the web material of the second reel at the splicing position, separating the splice from the web material remaining on the first reel, and then withdrawing web material from the second reel into the web processing apparatus; and completing the movement of the first reel to its final position.

Also there may be provided a mobile unwind stand for a reel of web material, having a movable base, means for supporting the reel such that it is rotatable about its longitudinal axis, and means for controlling the rate of that rotation, and a system for feeding web material to a web processing apparatus, having a plurality of such mobile reel stands, and a splicer adjacent an entrance to the web processing apparatus, the splicer being adapted to splice web material of a reel on one of the mobile unwind stands which is being fed to the entrance to the web processing apparatus to web material of a reel on another of the mobile unwind stands.

The mobile unwind stands provide: the transport systems between the paper store and the machine; the roll stand from which the web is unwound; and the means for returning part-used or reject rolls to the store. In use, successive reel stands may be positioned sequentially adjacent the splicing unit, and moved so that as the required amount of material has been unwound from one roll, the next can be in position. Thus, a replacement roll can be positioned, and the original roll removed, with the printing machine continuing its operation throughout. This reduces the amount of roll handling, facilitates the organisation of work at this part of the machine so as to fit in more flexibly with other machine operating tasks; and permits a machine layout with a better material flow, particularly in situations where part-used or reject rolls are to be removed from the machine.

The next three aspects of the invention are concerned with the imaging arrangements. These aspects are particularly, but not exclusively, concerned with web fed offset press. Such presses typically comprise, for each colour to be printed, and each repeat length: a pair of blanket cylinders between which the web passes (blanket-to-blanket formation); a pair of plate cylinders in contact with a corresponding blanket cylinder, and on which the image to be printed is mounted; and an inking and dampening system for each plate cylinder. Such a system is known as a "perfecting" press, as it prints on both side of the web. It is also known to provide an impression cylinder, and a single blanket cylinder, plate cylinder, and inking and dampening system, if only one side of the web is to be printed.

The second aspect of the present invention purposes an imaging apparatus such as a web-fed offset perfecting press, comprising a plurality of cartridges in an array or stack, or even a plurality of stacks. A common unit for printing medium is then provided in common for several cartridges. Thus, this aspect may provide a web-fed printing apparatus comprising a plurality of cartridges in an array, for printing a web feedable through the array, and at least one unit containing printing medium, each cartridges having means for transferring the printing medium from the unit to the web; wherein the at least one unit is mounted relative to the array so that the at least one unit and the cartridges of the array are capable of relative movement, thereby to permit successive interaction of the at least one unit with at least two of the cartridges. The cartridges may form a web-fed offset printing press, in which case each cartridge may have a pair of blanket cylinders, and a corresponding pair of plate cylinders. The common unit may then be an inking and dampening unit displaceable relative to the cartridges to supply selectively the plate cylinders of at least some of those cartridges, or alternatively the cartridges, themselves may be movable. Thus, it becomes possible to have a printing sequence that can be varied in detail in which the following features can be carried out: the inking the dampening unit is placed in an operative position for a first cartridge and a print run is carried out for that cartridge; then the blanket cylinders of the first cartridge are moved away from the web; the blanket cylinders of a second cartridge (which has different characteristics such as the nature of the image, the image pitch or colour) are moved into contact with the web when the inking and dampening unit has moved to that cartridge. A new printing run can thus be started at the second cartridge with very little time delay. It then becomes possible to change, e.g., the image on a plate cylinder of the first cartridge, whilst the printing machine is running.

The apparatus may include a plurality of inking and dampening units for supplying respective different colours simultaneously to a plurality of selected cartridges (with, in general, at least an equal plurality of cartridges not the being supplied). There may be a plurality of arrays or stacks with driers interposed as required, or a system in which the cartridges can be exchanged for others stored elsewhere.

It is also possible to achieve the feature of interchangability between one printed image and another, by providing a web-fed printing apparatus comprising a plurality of cartridges in an array for printing a web feedable through the array, each cartridge having means for transferring printing medium from a unit for containing such printing medium to the web, the means including at least one printing cylinder which is adapted to contact the web, wherein the at least one printing cylinder of one of the cartridges has a different circumference from that of the at least one blanket cylinder of at least one other of the cartridges.

The printing cylinder may be a blanket cylinder of an offset press, there then being a plate cylinder between the unit for containing the printing medium and the blanket cylinder. For an offset perfecting press there will then be a blanket cylinder, and a corresponding plate cylinder on each side of the web. For other offset presses there is one blanket cylinder, with an impression cylinder on the other side of the web. For a gravure press, the printing cylinder is etched, and the printing medium is transferred from the unit directly to the printing cylinder. Similarly in a flexographic or letter press, printing medium is transferred directly to the cylinder, which in this case has a raised surface carrying the printing medium. For gravure, flexographic, and letter presses there is again an impression cylinder on the other side of the web to the printing cylinder.

The third aspect of the present invention concerns movement of the blanket cylinders of a printing apparatus into and out of contact with the web and their corresponding plate cylinders. In the known systems, the cylinders are constrained so that the blanket cylinders must be precisely mounted in order to achieve their required setting with respect to one another and their corresponding plate cylinders when printing commences. This aspect of the present invention, however, envisages means for moving one of the blanket cylinders towards and away from the plate cylinder and the other blanket cylinder, and hence away from the web, and biasing means for preventing that other blanket cylinder following completely the movement of the first blanket cylinder.

This aspect may therefore provide a web-fed printing apparatus having at least one cartridge, the or each cartridge having a pair of plate cylinders and a pair of blanket cylinders; wherein: the or each cartridge has means for controlling movement of a first one of the blanket cylinders between a first position and a second position; the first position corresponding to a printing position, in which the first blanket cylinder is in contact with a corresponding one of the plate cylinders, and also applies a force to the other blanket cylinder, which force holds the other blanket cylinder in a first position in contact with the other plate cylinder; the second position corresponding to a withdrawn position, in which the first blanket cylinder is withdrawn from contact with the corresponding plate cylinder, and also from the other blanket cylinder, the withdrawal of the first blanket cylinder from the other blanket cylinder permitting that other blanket cylinder to move from its first position to a second position in which it is withdrawn from contact with its corresponding plate cylinder.

Thus, the blanket cylinders move between inoperative positions, in which no printing occurs, and an operative position in which the web is held between the two blanket cylinders, and the two blanket cylinders bear against the plate cylinders so that an image can be transferred.

The fourth aspect of the invention concerns the relationship between the printing arrangement and the subsequent web handling. The printing industry has developed in two directions. One of them is concerned with the handling of elongate webs, such as described above, whilst the other is concerned with handling material in sheet form. In general, each type has its associated problems, and workers in the art tend to concentrate on their own field. It has been realised, however, that the problems of folding occurring in the field of elongate web handling can be effectively solved using techniques from the sheet handling field, which techniques have been evolved to handle the products of a sheet-fed printing machine. Therefore, the fourth aspect of the present invention proposes that the output of a web printing machine is cut into sheets and is fed to a sheet folding system.

Thus this aspect may provide a method of processing at least one web of material comprising printing on the at least one web, cutting in a time relationship with the printing the or each printed web into a plurality of separate sheets, and folding each sheet by a folder whose action is timed in dependence on the arrival of a sheet at the folder, wherein there is continuous movement of the material from prior to the printing to the commencement of the folding of the sheets.

This aspect may also provide a method of processing at least one web of material, comprising printing on the at least one web, forming a longitudinal fold in the or each printed web, cutting in a timed relationship with the printing the or each web into a plurality of separate sheets, and folding each sheet by a folder whose action is timed in dependence on the arrival of a sheet at the folder.

Furthermore, this aspect may provide a method of processing at least one web of material, comprising printing the at least one web, forming transverse perforations in the printed web, cutting in a timed relationship with the printing of the or each web into a plurality of separate sheets, the folding each sheet by a folder whose action is timed in dependence on the arrival of a sheet at the folder.

In a similar way, the present invention may provide a web processing system comprising an apparatus for printing continuously at least one web of material, means for transferring the printed web continuously to a means for cutting the web into a plurality of separate sheets, which means has an action having a timed relationship with the printing means, and means for transferring the sheets continuously to a means for folding the sheets, which folding means has and action which is timed in dependence on the arrival of a sheet at the folding means;

- a web processing system comprising an apparatus for printing at least one web of material, means for forming a longitudinal fold in the or each web, means for cutting the web into a plurality of separate sheets, and means for folding the sheets;
- a web processing system comprising an apparatus for printing at least one web of material, means for forming a transverse perforation in the or each web, means for cutting the web into a plurality of separate sheets, and means for folding the sheets.

Once the web has been cut, it can be fed to a buckle, knife, or combination folder which may perform various known folding operations on each sheet. This is particularly advantageous when handling lightweight stock, in that the known sheet systems cannot easily handle such stock, at least not unless they run at very reduced speeds. However, it is easy to make an initial fold in the web from the web printing machine, thereby stiffening the material. It also becomes possible to provide a perforation for the first fold made by the folding machine.

BRIEF DESCRIPTION OF THE DRAWINGS

Embodiments of the invention will now be described in detail, by way of example, with reference to the accompanying drawings, in which.

DETAILED DESCRIPTION

Figure 1:
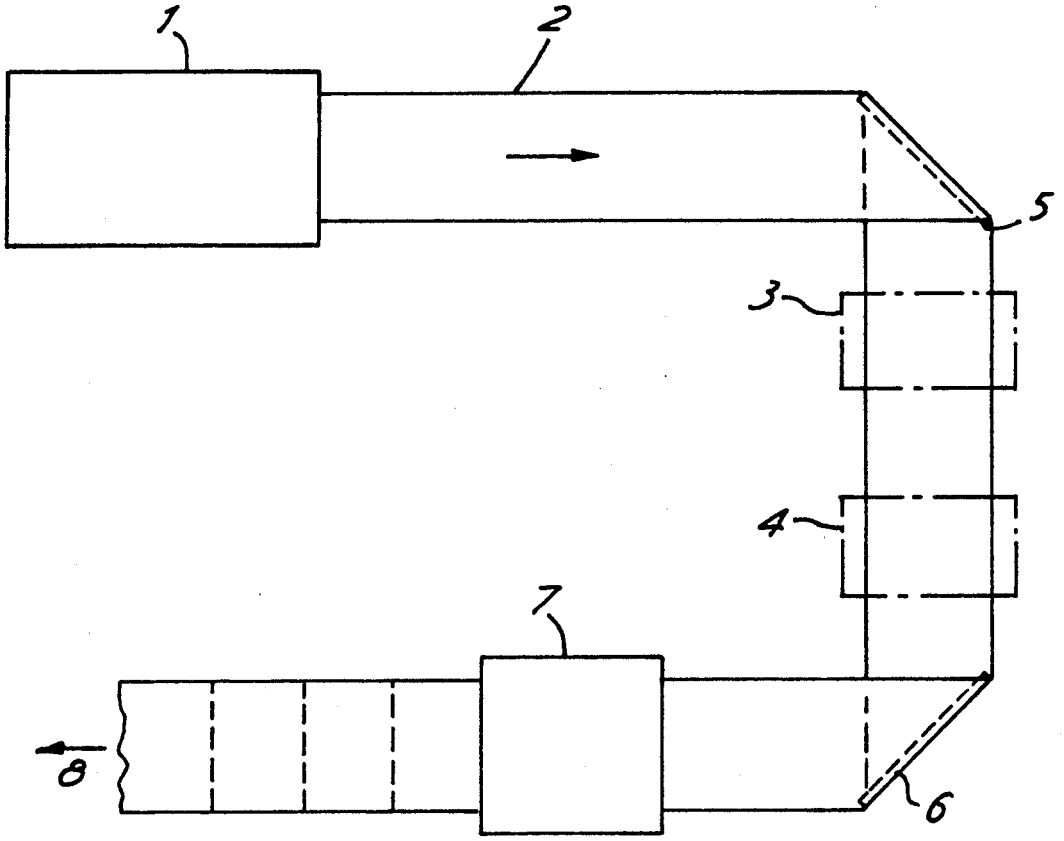
FIG. 1 shows a general view of a paper handling system with which the present invention is concerned.

Referring first to FIG. 1, a web (in this example, paper) handling system with which the present invention is concerned involved three parts. A first part, generally indicated at 1, takes paper from one or more paper rolls in the form of a web 2 and transports it to a printing unit 3 and an optional drying unit 4. As illustrated in FIG. 1, a right-angled turn in the paper web 2 is achieved by passing the paper round an angled bar 5. After passing through the printing unit 3, and the drying unit 4, the paper web 2 is again turned for convenience through 90° via bar 6, and passed to a cutting and folding arrangement generally indicated at 7. Sheets of paper printed, cut and folded as appropriate then pass for e.g. stacking in the direction indicated by the arrow 8. Of course, any arrangement of paper web input unit 1, printing station 3, drying station 4, and cutting and folding arrangement 7 may be provided, the actual configuration depending on space and similar constraints.

As discussed above, the present invention is concerned with various developments of the components of this system.

Figure 2:
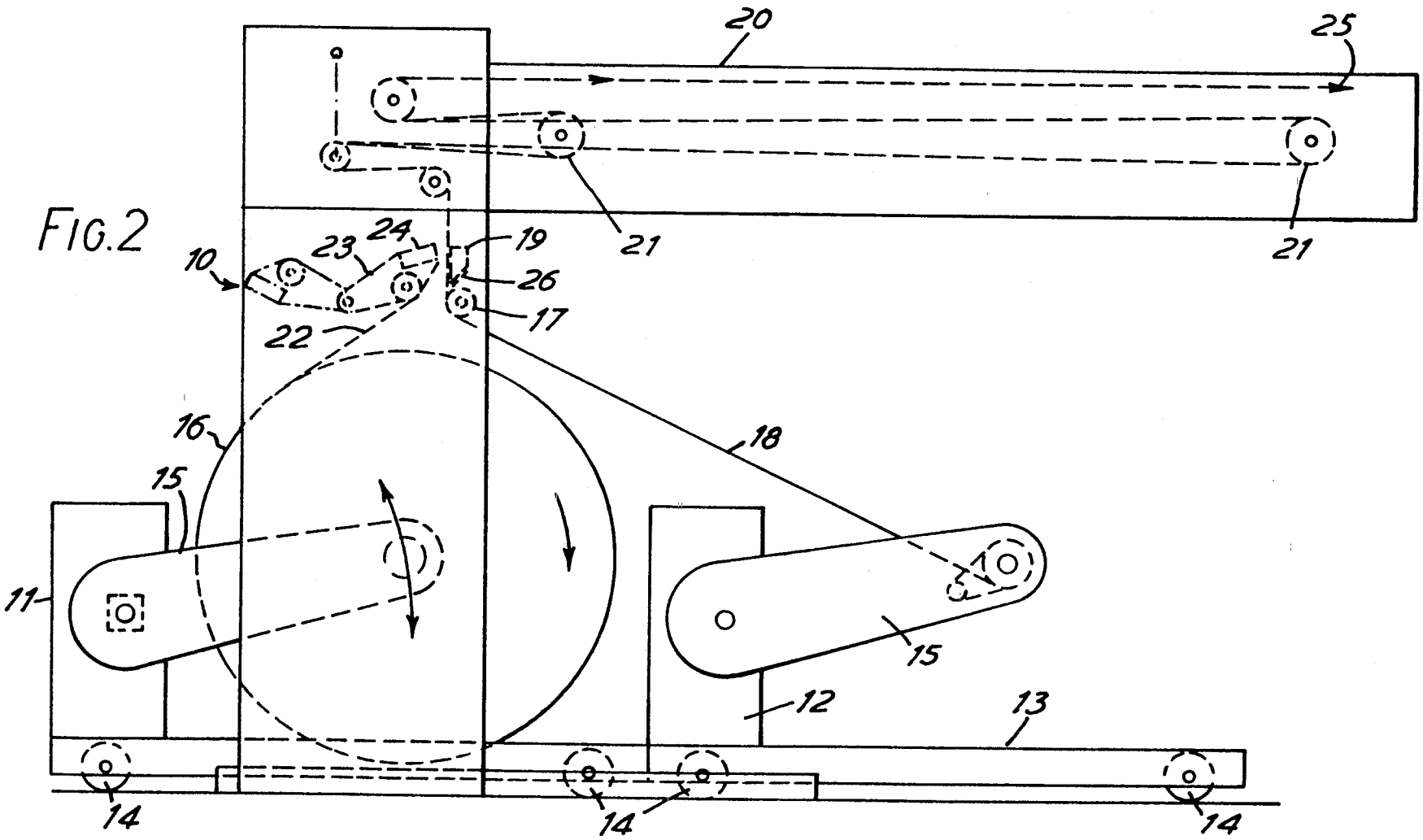
FIG. 2 shows a schematic view of a paper web input system.

FIG. 2 shows one embodiment of a transport and feeding arrangement 1 for material (e.g. paper) on rolls. It consists of a splicing unit generally indicated at 10 and a series of mobile reel stands in the form of roll transportation trolleys 11, 12 (although only two are shown, more may be provided). Each trolley consists of a base 13 with wheels or castors 14 which supports roll-lifting and carrying arms 15. The arms 15 of each trolley 11, 12 carry a roll 16 of paper with its axis generally horizontal so that the web of paper may be drawn from the roll and supplied to the splicing unit 10. Each trolley has means for controlling the unwinding of a roll in e.g. the arms 15 of the trolley 11, 12. The leading end of each trolley 11, 12 may be provided with means for interconnecting with the trailing edge of another trolley, or they may be queued without being connected. In this way, it becomes possible to push the trolleys 11, 12 sequentially under the splicing unit 10, so that as one roll is used up, another may be started. This idea of queued trolleys carrying paper rolls may be used with flying splicing arrangements, but zero-speed arrangements are preferred and the arrangement illustrated in FIG. 2 corresponds to the latter.

The trolleys serve for transport from the paper store to the machine and back, and as roll stands from which the paper is unwound. They can be queued so that they may be positioned sequentially adjacent the splicing unit, and moved so that as one roll finishes (on trolley 12) the next (on trolley 11) can be in position. The running web on the trolley 12 is therefore positioned to pass over a roller 17 at the splicing unit 10 at substantially the same angle, so that each subsequent splice is of a predetermined cut off length and is on the same side of the web. This reduces the amount of roll handling, enables the work at this part of the machine to be fitted in more flexibility with other machine operating tasks; and permits machine layout with a better material flow, particularly in situations where part used or reject rolls are to be removed from the machine.

As shown in FIG. 2, a paper web 18 from the leading trolley 12 passes via the roller 17 and a pressure plate 19 to a festoon system 20. The festoon system 20 has a roller 21 which is movable between the position shown in solid lines and the position shown in dotted lines. The roll 16 carrying the next web 22 of paper to be used is mounted on the second trolley 11, and its leading end mounted on a pivotable unit 23. The pivotable unit 23 has a pressure system 24 into which the leading ends of the paper web 22 is fitted, preferably when the unit 23 is in its withdrawn position shown in dotted lines.

As the first web 18 is run, the roller 21 is moved to the position shown in solid lines so that there is a significant amount of paper running within the featoon unit 20. When the end of the web 18 being withdrawn from the trolley 12 approaches, or it is desired to replace one web with another, the input of the web 18 to the festoon unit 20 is stopped, but the output (in the direction of arrow 25) continues as the roller 21 moves towards its dotted position. With the part of the web 18 adjacent the pressure plate 19 stationary, the unit 23 is swung through the position shown in solid lines until the attachment unit 24 comes in contact with the pressure plate, thereby pressing the end of the web 22 (on which adhesive is provided) onto the web 18, causing a splice. The web 18 is then cut below the pressure plate 19 by a knife 26, unit 23 is then withdrawn, and the web 22 may then be drawn into the festoon unit 20 and the roller 21 moved back to its original position shown by a full line.

Figure 3A:
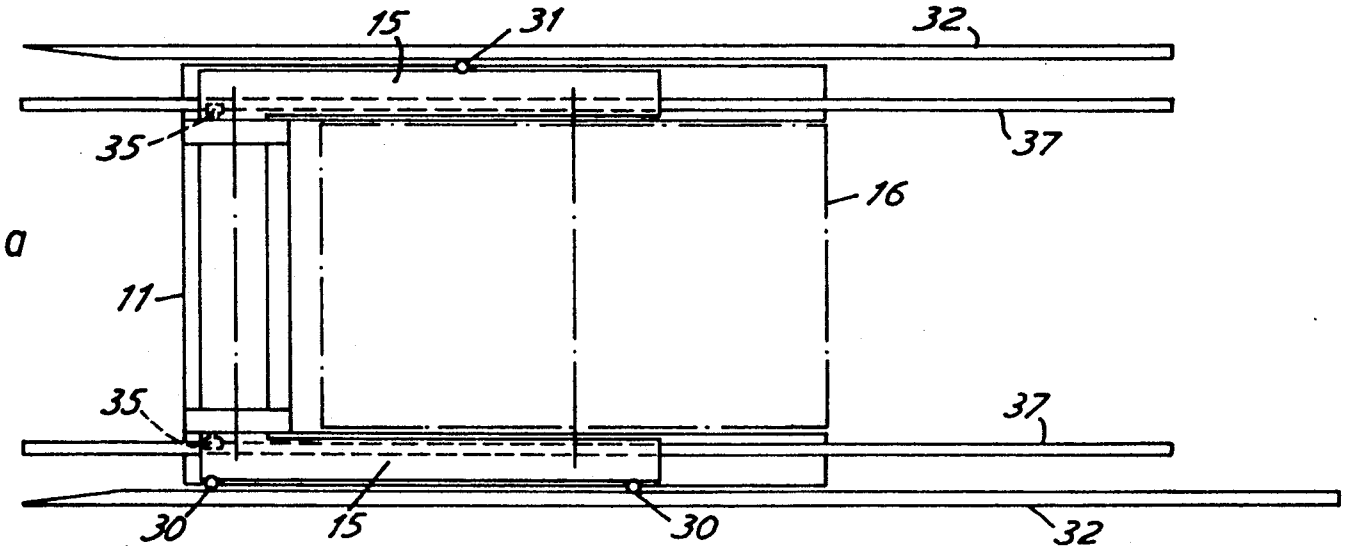
FIGS. 3a and 3b show the alignment arrangement for the system of FIG. 2 in plan and side view respectively.

The accuracy of the feed of a web 18, 22 into the splicing unit 10 and hence through the festoon unit 20 to a printing machine depends on precise alignment of the axis of the rolls 16. If the axis of rolls 16 is not precisely positioned perpendicular to the direction of arrows 25 of the output from the festoon unit 20, there is the risk that the web 18, 22 may be creased or "track" (i.e. move sideways) in the printing machine. To prevent this, it is desirable that there is an arrangement for aligning the trolleys 11, 12, and hence the rolls 16, below the splicing unit. One such arrangement which may be used is shown in FIGS. 3a and 3b.

There are two different alignments needed: to ensure that the axis of the rolls is precisely transverse to the direction of movement of the web, and to ensure that the axis of the roll is at the correct distance from the splicer 10. FIG. 3a shows the first of these. As illustrated, one of the arms 15 of a trolley 11 has two guide balls 30 rotatably mounted on its outer surface, and the other arm 15 has a single guide ball 31, which is rotatably mounted, but also spring loaded, on its outer surface. When the trolley 11 is passed below the splicer 10 (in FIG. 2) the balls 30, 31 contact a pair of guide rails 32, one of each side of the trolley. The two balls 30 ensure that the corresponding arm 15, and hence the rest of the trolley 11, is precisely aligned with the guide rail 32, and the spring loaded ball 31 ensures adjustment due to slight variations in the width of the trolley. The three-point contact of the balls 30, 31 gives accurate alignment with the guide rails 32, which themselves may be accurately aligned with the direction of movement of the web.

As was mentioned with reference to FIG. 2, the trolleys are mounted on wheels or castors 14 and in theory, if the floor 33 was prefectly flat, and the wheels were precisely made, this would ensure accurate vertical positioning of the axis of a roll 16. In practice, however, such accurate positioning is not possible, and therefore the FIG. 3b shows one way of achieving vertical positioning. Each trolley 11 has a pair of support rollers 35 on each side thereof, and a ramp 36 is positioned on the floor 33 generally below the splicer 10. As the leading wheel 14 of the trolley 11 moves onto the ramp 36, the support rollers 35 engage a pair of guide rails 37, one on each side of the trolley 21. The guide rails 37 slope upwardly in the direction of trolley movement, so as the trolley 11 moves, the action of the support roller 35 and the rail 37 is to lift the rear wheel or castor 14 of the trolley 11 clear of the floor 33. Hence the vertical position of the trolley, and hence the roll 16, is determined primarily by the guide rail 37.

Figure 3B:
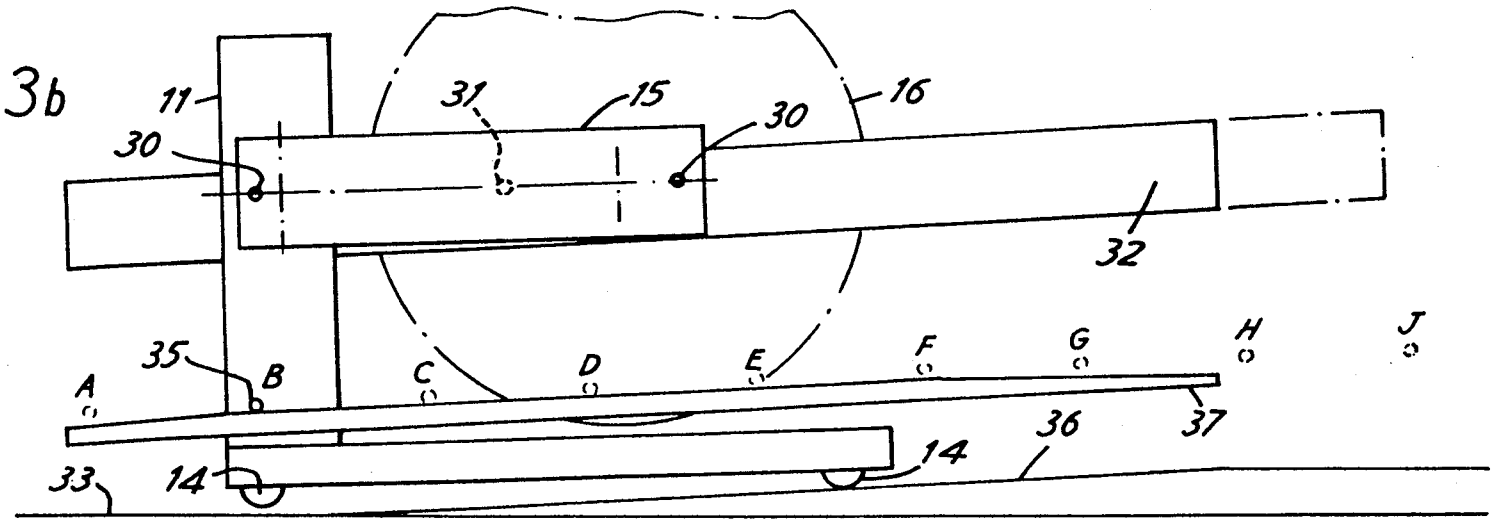

As the trolley moves forwards, the support roller 35 moves through positions A to J shown in FIG. 3b.

The system described above requires the arms 15 of the trolley 11 to be locked in position during the movement of the trolley 11 below the splicer 10. It is also thought possible to achieve accurate vertical positioning by moving the arms 15 to a position determined by a suitable stop, although such an arrangement is not preferred.

Thus, FIGS. 3a and 3b illustrate one embodiment of the first aspect of the present invention, embodiment as queuing trolleys for paper rolls.

Figure 4:
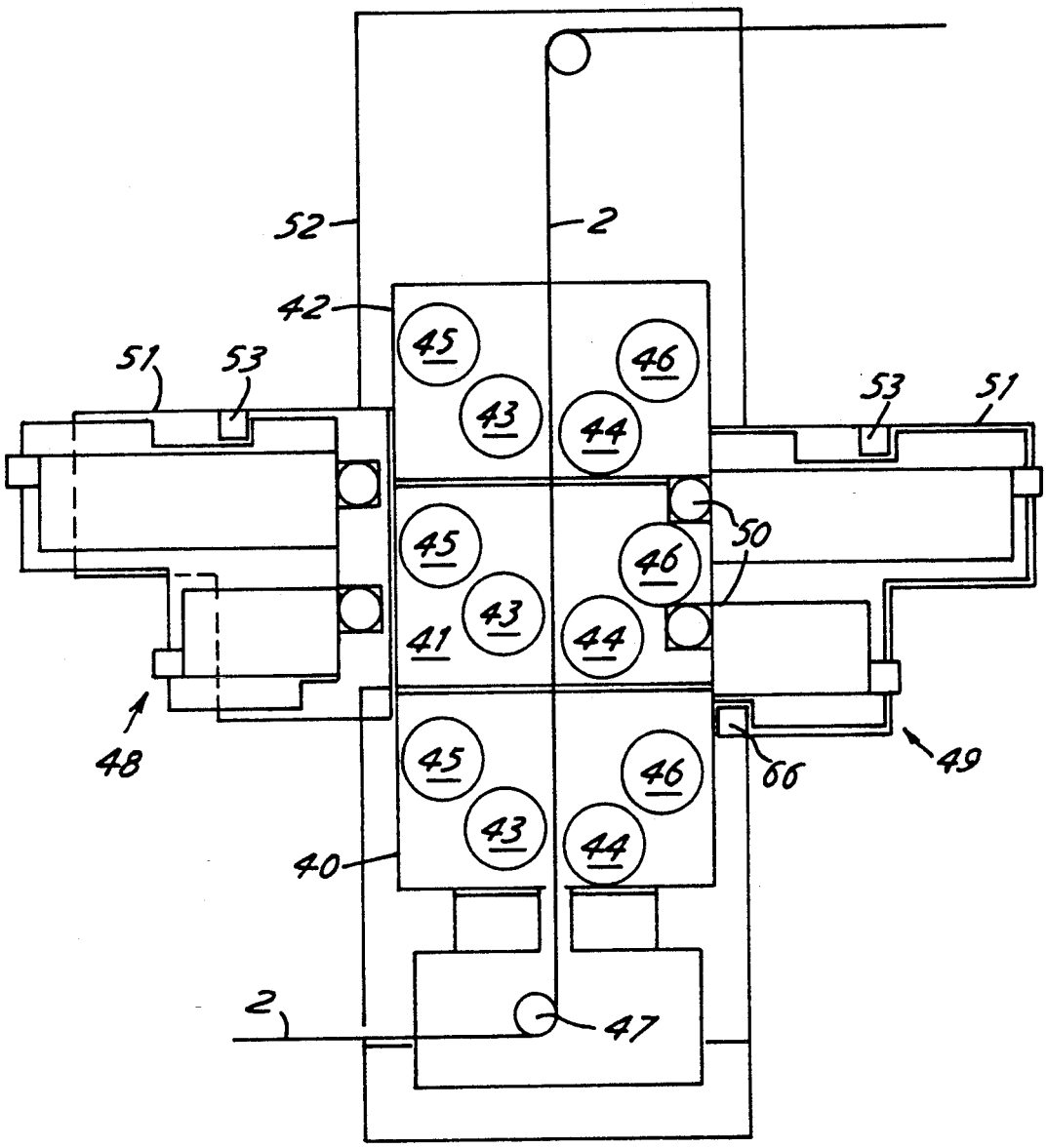
FIG. 4 shows a first embodiment of a web-fed offset perfecting press embodying the second aspect of the invention.

As explained with reference to FIG. 1, the paper web then passes to a printing unit 3, FIG. 4 illustrates an embodiment of such a unit 3, being a web-fed offset perfecting press according to the second aspect of the present invention. As illustrated, the press has three cartridges 40, 41, 42, with each cartridge having a pair of blanket cylinders 43, 44 in blanket-to-blanket configuration, and a pair of plate cylinders 45, 46 the outer surface of each of which is formed by a printing plate in contact with a corresponding one of the blanket cylinders 43, 44; i.e. each cartridge contains a "printing couple". Normally the plate and blanket cylinders have the same diameter, but it is also known to have plate cylinders of half the circumference of the corresponding blanket cylinder. As illustrated, the cartridges 40, 41, 42 are immediately adjoining each other, as this gives the array of cartridges 40, 41, 42 a small size. It would be possible, however, for the cartridges 40, 41 42 to be in a spaced-apart array. The web 2 passes round a roller 47 and between the pair of blanket cylinders 43, 44 of each cartridge 40, 41, 42. It is preferable if the cartridges 40, 41, and 42 are stacked substantially vertically but substantially horizontal arrangements are also possible including arrangements in which the cartridges are movable transverse to the web. The image to be printed on the web 2 is carried on the plate cylinders 45 and 46, and transferred via the blanket cylinders (hence "offset" printing) to the web. This, in itself, is known.

As shown in FIG. 4, a unit containing printing medium, e.g. an inking and dampening train 48, 49 is provided on each side of the web. The inking and dampening train 48, 49 are capable of moving vertically separately or together and each may contain throw-off mechanisms to facilitate that vertical movement (compare trains 48 and 49).

When printing is to occur, the inking and dampening trains 48, 49 are moved in the vertical direction to register with one of the cartridges 40, 41, 42. The inking and dampening rollers 50 are brought into contact with the plate cylinders 45, 46 by means of mechanisms which ensure correct operating geometries and pressures. As illustrated, the inking and dampening trains 48, 49 are provided on each side of the web 11, but are common to all three cartridges 40, 41, 42. If the cartridge 41 is to print, the trains 48, 49 are operated so that the inking and dampening rollers 50, move into contact with the two plate cylinders 45, 46 of that cartridge 41. A printing run then occurs. At the end of that printing run, the inking and dampening trains 48, 49 are moved to their thrown-off configurations (as shown for 48) and the trains 48, 49 are moved vertically until they are adjacent one of the other two cartridges 40, 42. By moving the inking and dampening rollers 50 into contact with the plate cylinders 45, 46 of another cartridge 40 or 42, a new print sequence can operate.

It is also possible for the cartridges to move vertically, with the trains remaining stationary, but this is mechanically more difficult to achieve. Note also that this arrangement permits "in machine" storage of the cartridges, which is more efficient than the known arrangements.

Figure 5:
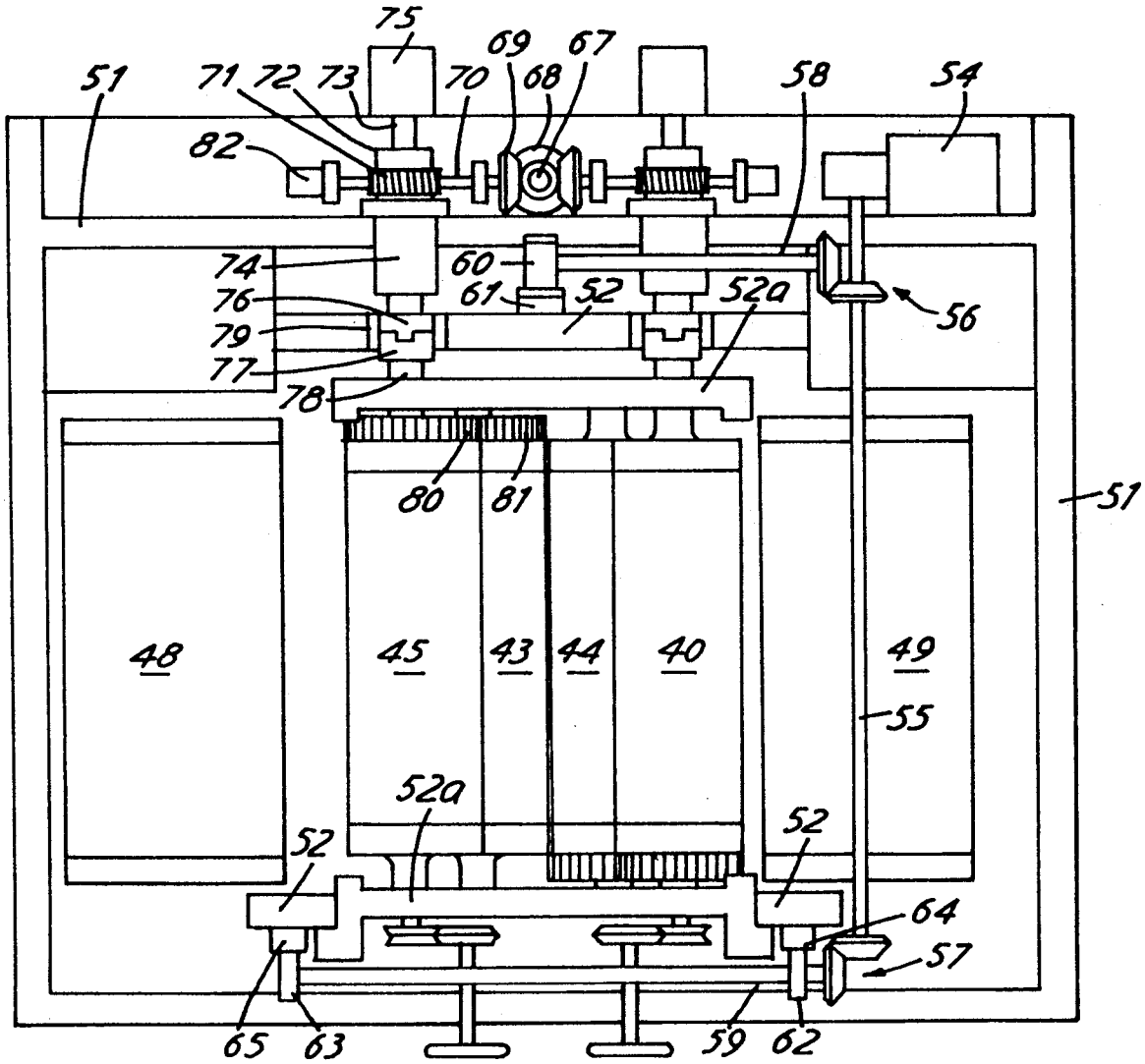
FIG. 5 shows a plan view of the drive system for the press of FIG. 4.

A suitable drive system for the press of FIG. 4 will now be described with reference to FIGS. 5 and 6. As shown in the plan view of FIG. 5, the inking and dampening trains 48, 49 are mounted on a support frame 51 movable relative to the main frame 52 of the press which supports the cylinders 43, 44, 45, 46 via end supports 52a. The mechanism for horizontal movement of the inking and dampening trains 48, 49 is not shown, but FIG. 4 shows that a stop 53 may be provided on the support frame 51 to limit this horizontal movement.

The vertical movement of the support frame 51, and hence of the inking and dampening trains 48, 49 is controlled by a hoist motor 54 mounted on the support frame 51. That motor 54 drives a shaft 53 extending across the support frame 51 and connected via bevel gears 56, 57 to two shafts 58, 59. Shaft 58 drives a pinion 60 engaging a toothed rack 61 on the main frame 52. Similarly, shaft 59 drives two pinions 62, 63 also attached to the main frame 52 which engage corresponding toothed racks 64, 65 on the opposite side of the main frame 52. Thus rotation of the motor 54 drives shafts 55, 58, 59 causing the pinions 60, 62, 63 top move either up or down on the corresponding racks 61, 62, 65, hence moving the support frame 51 relative to the main frame 52. In this arrangement, a three-point mounting is used, but it would also be possible to provide a four or more point mounting by providing pinions additional on the shafts 58, 59 with corresponding racks on the main frame 52. Accurate vertical positioning of the support frame may be achieved either by accurate control of the motor 54 or by providing a stop 66 (see FIG. 4) on the main frame 52. The stop 66 may be spring-loaded so that it moves out from the main frame 52 when the support frame 51 moves past it, and the support frame 51 then lowered onto the stop 66. Clearly the stop 66 has to be depressed to permit downward movement of the support frame 51, e.g. to operate cartridge 40 in FIG. 4.

The drive for the cylinders 43, 44, 45, 46 will now be described. In fact, the drive train for cylinders 43, 45 and the train for cylinders 44, 46 are the same and the following refers only to the cylinders 43, 45.

A shaft 67 extends up the main frame 52 and movably on it, but engaged for rotation with it is a gear 68 which meshes with a corresponding gear 69 connected to a shaft 70 which extends to a worm 71 which mates to a worm wheel 72. A shaft 73 is secured to the worm wheel 72 and is supported on the support frame 51 by a support 74. At the end of shaft 73 remote from the cylinders 43, 45 is an air cylinder 75 which is capable of moving the shaft 73 axially. At the other end of the shaft 73 is a clutch plate 76 which engages a corresponding clutch plate 77 on a stub shaft 78 extending from the plate cylinder 45. The clutch plates 76, 77 and their attached shafts 73, 78 pass through an aperture 79 in the main frame 52. At the end of the plate cylinder 45 are gears 80 which mesh with corresponding gears 81 on the blanket cylinder 43.

Thus, when the air cylinder 75 moves the shaft 73 so that the clutch plates 76, 77 are in engagement, drive from the shaft 67 is transmitted via gears 68, 69, shaft 70, worm 71, worm gear 72, shaft 73, clutch plates 76, 77, and the stub shaft 78 to the plate cylinder, and hence via gears 80, 81 to the blanket cylinder.

When the air cylinder 75 moves the shaft 73 to disengage the clutch plates 76, 77 no drive is transmitted. Furthermore, this movement of the shaft 73 is sufficient to move the clutch plate 76 clear of the aperture 79, permitting the whole assembly on the support frame to be moved relative to the main frame 52 to another cartridge. This arrangement has the advantage that cylinders of cartridges not in use cannot have any drive thereto, and therefore can be handled safely, e.g. for replacement of the printing plates of those cylinders. Since the cylinder drive mechanism moves with the inking and dampening trains, it is impossible accidentally to drive cylinders which are not to print at any particular time.

The clutch formed by clutch plates 76, 77 has another function. The clutch plates 76, 77 form a "single position" clutch preset to synchronise the position of the corresponding plate cylinder 45 to the drive. Thus, irrespective of the initial position of the plate cylinder 45, its rotation will be synchronised with the rotation of the shaft 67.

Sometimes, however, it is desired to vary the synchronisation of the shaft 67 and the plate cylinder 45, to advance or retard the printing image relative to the main drive. To do this, the worm 71 is moved along shaft 70 by a linear actuator 82, which normally holds the worm 71 fixed on the shaft 70. This rotates the worm wheel 72 which, via shaft 73, and clutch plates 76, 77 rotates the plate cylinder 45 relative to the position of the drive shaft 67. The movement of the worm 71 may also be achieved using a motor or hydraulic ram. Movement of the other plate cylinder 46 relative to the shaft 67 may be achieved in the same way either simultaneously with or separately from movement of the plate cylinder 45.

The drive to the inking and dampening cylinders 50 of the inking and dampening trains 48, 49 will now be described with reference to FIG. 6. Although FIG. 6 is an equivalent view to that of FIG. 4, the cartridges 40, 41, 42 have been omitted for the sake of clarity, as has the drive from hoist motor 54 to move the support frame 51 relative to the main frame 52.

Figure 6:
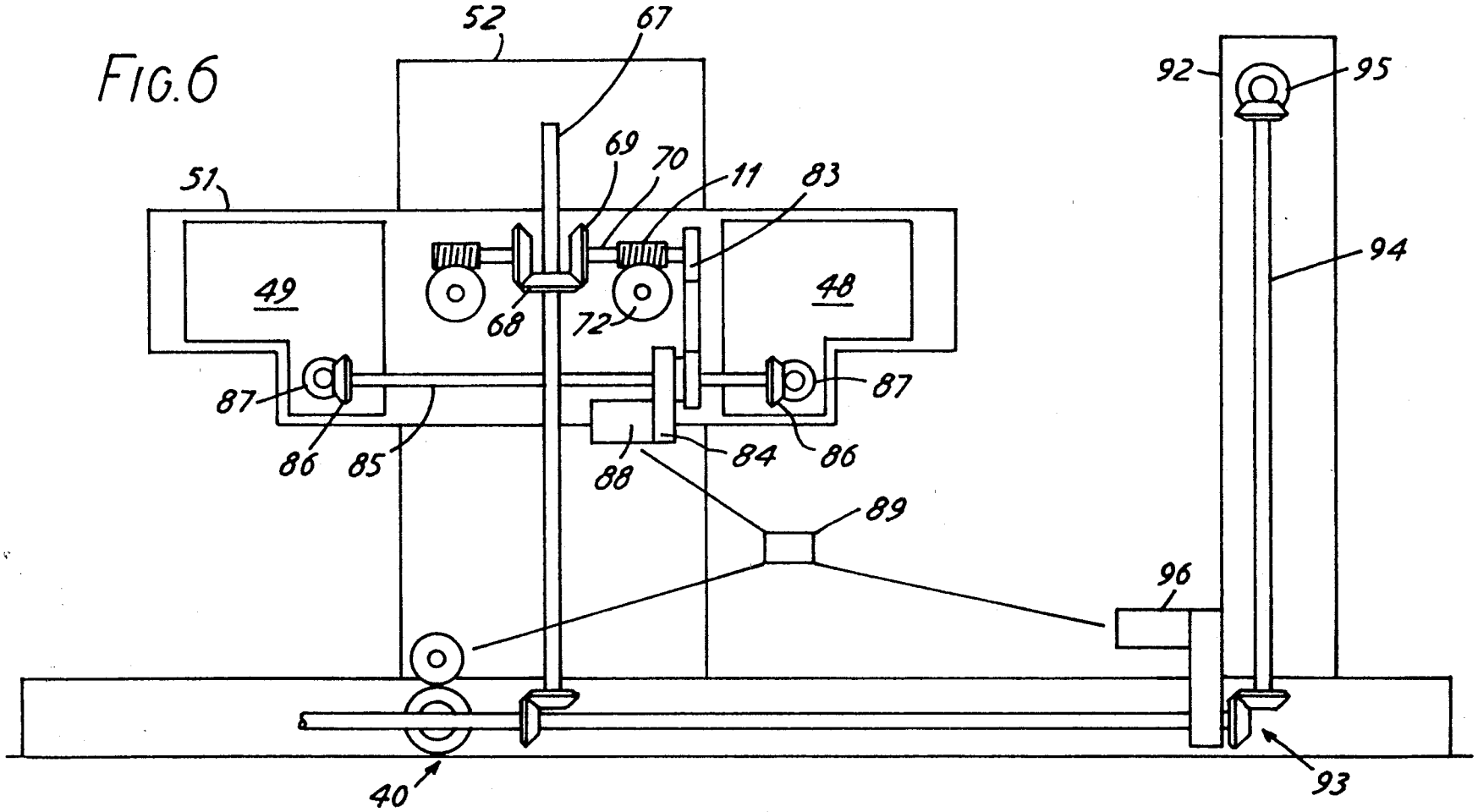
FIG. 6 shows a side view of the drive system for the press of FIG. 4.

As can be seen from FIG. 6, gears 83 extend from the shaft 70 from gear 69 to the worm 71. These gears 83 engage on an epicyclic gearing 84 on a further shaft 85. Each end of the shaft 85 carries gears 86 which engage gears 87 which connect to the drive system within the inking and dampening units in a conventional way. Thus the shaft 70 is connected to shaft 85 and the drive from shaft 69 which drives the cylinders 43, 44, 45, 46 as discussed with reference to FIG. 5 also drives the inking and dampening rollers 50.

However, this synchronisation depends on the diameter of the plate cylinders 45, 46, and if the press has two different sizes of cylinders, the drive system discussed above can only be in synchronisation for one size, and printing would be out of synchronisation when the inking and dampening units 48, 49 were moved to a cartridge having cylinders of a different size. The arrangement of FIG. 6 overcomes this by providing an auxiliary drive motor 88 connected via the epicyclic gearing 84 to the shaft 85. The speed of rotation of that auxiliary motor 88 is sensed, and the result fed to a comparator 89 which compares that speed with the speed of rotation of rollers 90 between which the paper web passes. These rollers 90 may also be associated with epicyclic gearing. If it is found that the drive is not synchronised, then the motor 88 is speeded up or slowed down until synchronisation is achieved. Thus the drive to the motor 88 modifies the drive transmitted by the gearing 83 to the shaft 85.

FIG. 6 illustrates a further feature of the system, namely that the shaft 67 which drives the plate and blanket cylinder is driven from a shaft 91 which extends beyond the printing station. Thus, additional printing stations may be connected to the shaft or, as illustrated in FIG. 6, may be connected to the perforating tool of a pre-folder 92, or the perforator and cutter of a cutting station. These will be described in detail later, but as can be seen the main shaft 91 has gears 93 drining a shaft 94 of the pre-folder 92 which rotates a perforating tool 95. Again, epicyclic gearing 96 may be provided, linked to the comparator 89.

Figure 7:
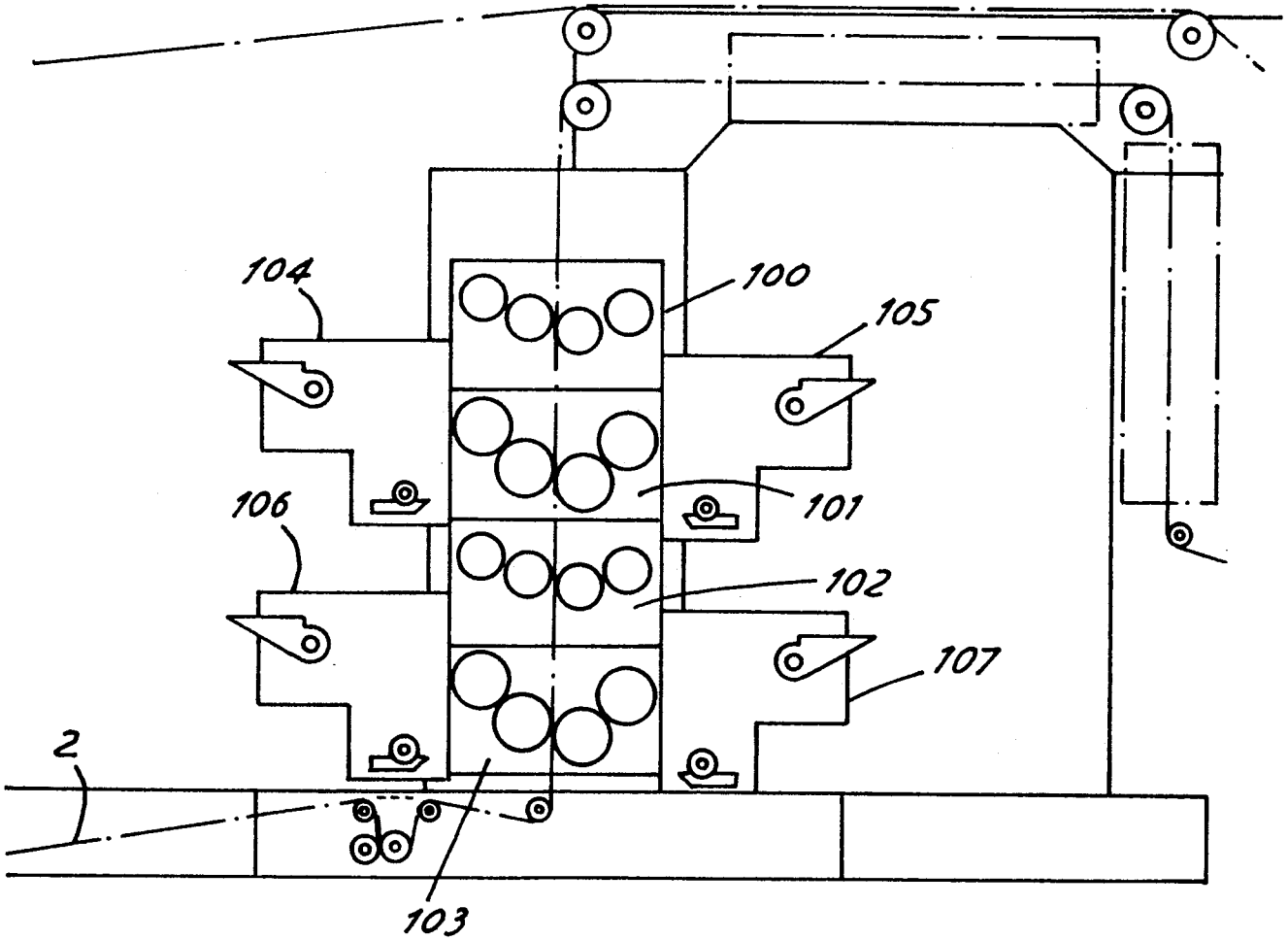
FIG. 7 shows a second embodiment of a web-fed offset perfecting press embodying the second aspect of the present invention.

As illustrated in FIG. 4, one pair of inking and dampening trains 48, 49 is provided in common for three cartridges. In general, therefore, the three cartridges may have different images on their plate cylinders, or even different sizes of cylinders, so that by changing from one cartridge to another, the pring length may be varied. Other arrangements are also possible, however, FIG. 7 illustrates an example of this having four cartridges 100, 101, 102, 103, each of which is similar to the cartridges 40, 41, 42 of the arrangement shown in FIG. 4. The web 2 of paper passes up the middle of the cartridge 100, 101, 102, 103. Four inking and dampening trains are provided, an upper pair 104, 105 serving the upper two cartridges 100, 101 and a lower pair 106, 107 serving the lower two cartridges 102, 103. In this way, for example, it is possible to print two different colours in like size print cylinders, and yet still maintain the possibility of change of image and/or repeat length. Also, as shown in FIG. 7, the cylinders of the cartridges may be different sizes, e.g. with the cylinders of cartridges 100, 102 being smaller than the cylinders of cartridges 101, 103. The press shown in FIG. 7, apart from having four cartridges, as discussed above, may be generally similar to the press of FIG. 4, and have a drive similar to that described with reference to FIGS. 5 and 6. Thereafter, further detailed description of the arrangement of FIG. 7 will be omitted.

One feature of this system is that by adding additional cartridges, and possibly additional inking and dampening trains 48, 49, the number of different printing operations can be increased.

The embodiment described above with reference to FIGS. 4 to 7 have the inking and dampening units moving vertically relative to a vertically stacked array of cartridges. It is also possible to have a horizontal arrangement in which cartridges are in a fixed horizontal array and the inking and dampening units are movable relative to the cartridges on which printing is to commence. One or two inking and dampening units may be used. The drive to the plate cylinders and the inking and dampening units is as described in the vertical unit shown in FIG. 5. The difference lies in the fact that a horizontal power shaft running parallel to the main power shaft may be used to drive the plate cylinders. The drive from the main power shaft may be provided by a vertical shaft connecting the power shaft to the horizontal shaft through two pairs of bevel gears.

As described above, the array of cartridges is fixed and the inking and dampening units are movable. Since the present invention depends on relative movement, it is also possible to have the inking dampening units fixed and move the cartridges of the array. The cartridges may be moved by many ways, such as rollers, guide rails, or pneumatic jacks, and the drive to the plate cylinders of the cartridges may be achieved by single toothed clutches as described with reference to FIG. 6. The advantage of an arrangement using movable cartridges is that the inking and dampening units are fixed and hence the drive to the system may be fixed. However, it is currently considered to be more difficult to move the cartridges than to move the inking and dampening units.

Figure 8:
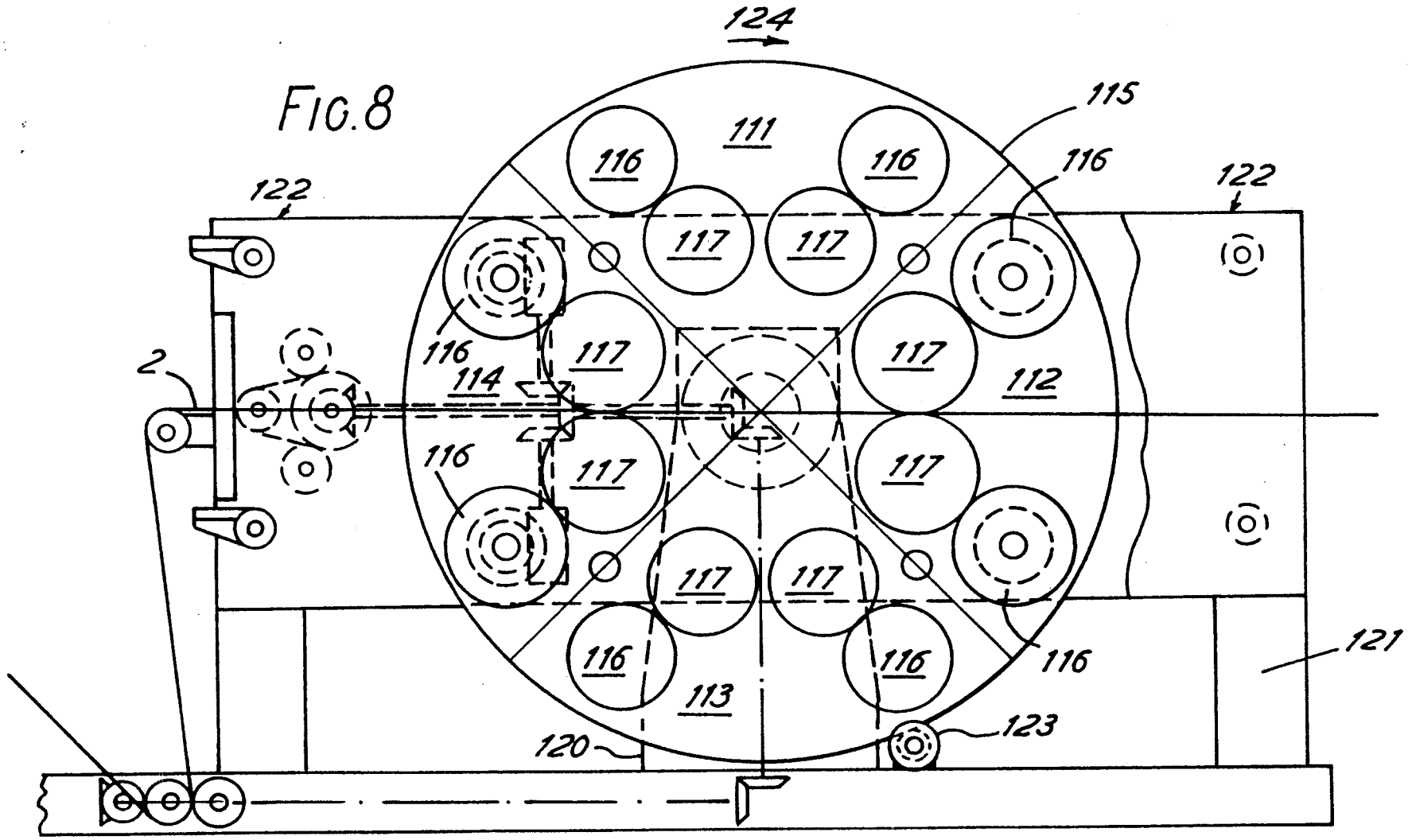
FIGS. 8 and 9 show a third embodiment of a web-fed offset perfecting press embodying the second aspect of the present invention, FIG. 8 being a side view and FIG. 9 being a plan view.
Figure 9:
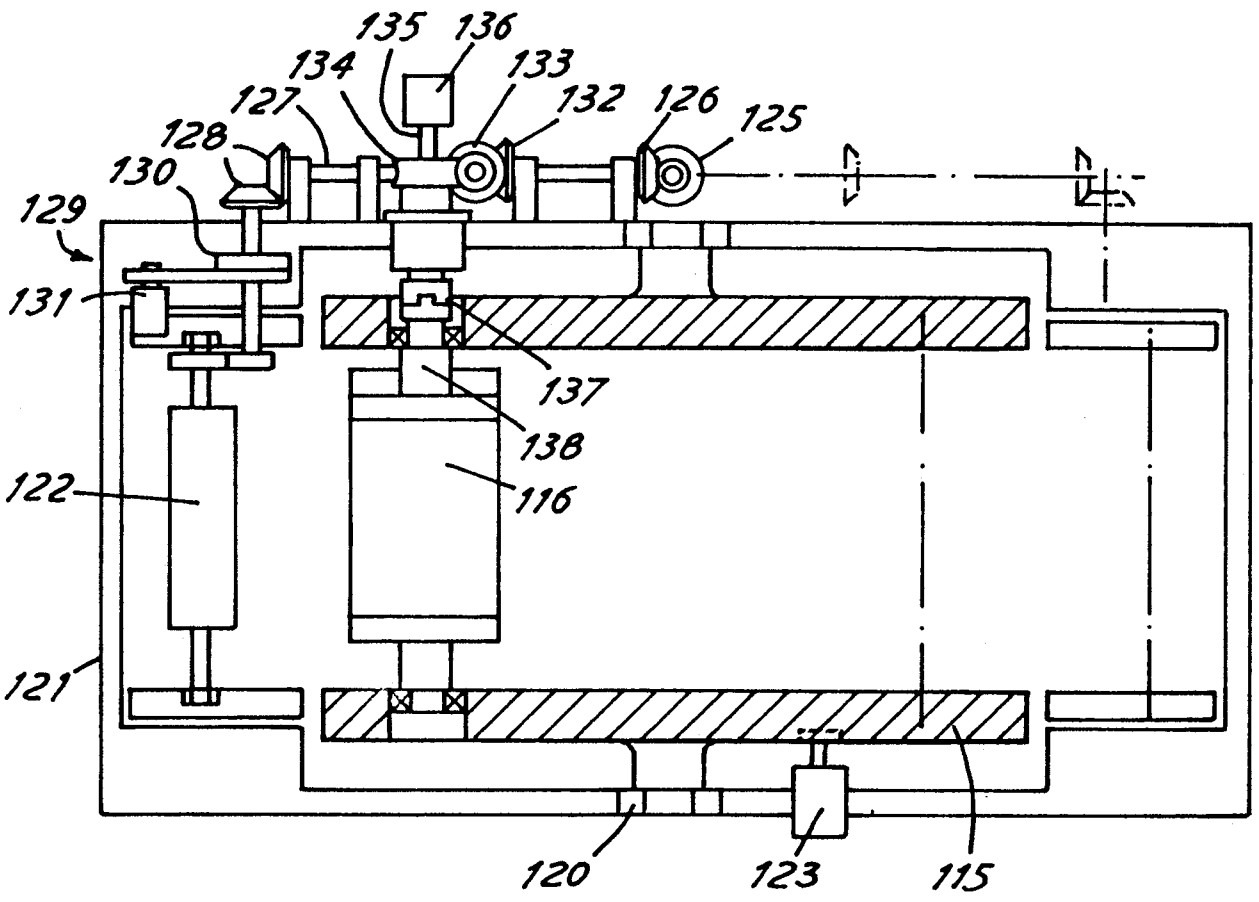

A further embodiment involving fixed inking and dampening units and movable cartridges is shown in FIGS. 8 and 9. This embodiment has four cartridges 111, 112, 113, 114 such as to form a carousel 115. As illustrated in FIG. 8, each cartridge has a pair of plate cylinders 116 and a pair of blanket cylinders 117 in a manner generally similar to the plate and blanket cylinders of the cartridges 40, 41, 42 of the embodiment of FIG. 4. However, it can be seen from FIG. 8 that the plate and blanket cylinders 116, 117 of the cartridges 111, 113, are smaller than the blanket cylinders 116, 117 of the cartridges 112, 114. This enables the cartridges 111, 113, and the cartridges 112, 114 to give different point repeat lengths.

A web 2 of paper enters the printing machine via rollers 118, 119 to move along a horizontal path through two 114, 112 of the four cartridges 111, 112, 113, 114 of the carousel 115. The carousel is rotatably supported on a frame 120 and a second frame 121 supports one or two inking and dampening units 122 (one inking and dampening unit is shown more clearly in FIG. 9). Where one inking and dampening unit is provided it is preferably on the side of the carousel 115 into which the web is fed. Where two inking and dampening units are provided they are normally on opposite sides of the carousel 115 to permit the cartridges 111, 113 or the cartridges 112, 114 to be driven.

The printing machine shown in FIGS. 8 and 9 may operate in one of several ways. For example, it is possible to carry out a print run using only cartridge 114, and during that print run, cartridge 112 may be prepared for a different print run. When the print run through cartridge 114 is completed, the blanket cylinders 117 of cartridge 114, may be withdrawn from the web 2, and the drive to that cartridge removed and then the blanket cylinders 117 of cartridge 112 moved into contact with the web and a drive applied to cartridge 112. A print run may then be carried out using cartridge 112 and cartridge 114 prepared. If cartridges 112 and 114 have the same printing repeat length or printing diameter, it is possible to carry out two colour operation with cartridges 112 and 114 working in tandem.

To change printing to cartridges 111, 113, a motor 123 drives the carousel 115 and turns it on its frame 120, through 90° so that the cartridges 111, 113 are aligned with the web 2. Accurate positioning of the carousel may be achieved by steps (not shown). This rotation of the carousel 115 means that the web 2 must be broken in order to change from one pair of cartridges to the other, and hence this embodiment is less advantageous than the embodiment of FIG. 4. As shown by arrow 124, the carousel 115 may be rotated clockwise or anticlockwise, as desired.

The drive arrangement for the embodiment of FIGS. 8 and 9 will now be described. Referring particularly to FIG. 9, a shaft 125 (which may be connected to a drive system for an entire printing system as discussed with reference to FIG. 6) drives via gears 126 a shaft 127, and hence via gears 128 to a drive arrangement 129 for the inking and dampening unit 122. The drive arrangement 129 may be similar to that described with reference to FIG. 6, i.e. the drive may pass via epicyclic gearing 130 which may be acted on by an auxiliary motor 131 enabling the synchronisation of the drive.

The shaft 127 also has a further gear 132 which connects to a worm 133 acting on a worm wheel 134. The worm wheel turns a shaft 135, at one end of which is a linear actuator 136 and at the other end of which is a clutch 137. The clutch 137 connects to a shaft 138 which drives a plate cylinder 116 of one of the cartridges 111, 112, 113, 114. Thus the drive to the cartridge of this embodiment is generally similar to that described with reference to FIG. 5, and its operation will therefore be immediately apparent.

As shown schematically on the right hand side of FIG. 9, the shaft 127 may also extend to the opposite edge of the carousel 115, to drive another inking and dampening unit (not shown).

A further development of the arrangement shown in FIG. 4 (or FIGS. 7 or 8 and 9) is concerned with the mounting of the cylinders within the cartridges 40, 41, 42 (100, 101, 102, 103 or 111, 112, 113, 114). Clearly, if the cylinders were mounted in a conventional manner each time a cartridge is required to be changed, the printing positions would require precise and lengthy re-setting. Therefore, the third aspect of the present invention concerns an arrangement for moving the blanket cylinders easily into and out of their precise contact positions. When they are in contact, printing can occur. When they are moved out of contact they can then not hamper continuous printing, e.g. by a different cartridge. Furthermore, a cartridge may be removed from a press and replaced e.g. by a cartridge having cylinders of different size, and brought into precise running setting quickly and easily. In this way, many changes may be made to the machine with minimum downtime.

Figure 10:
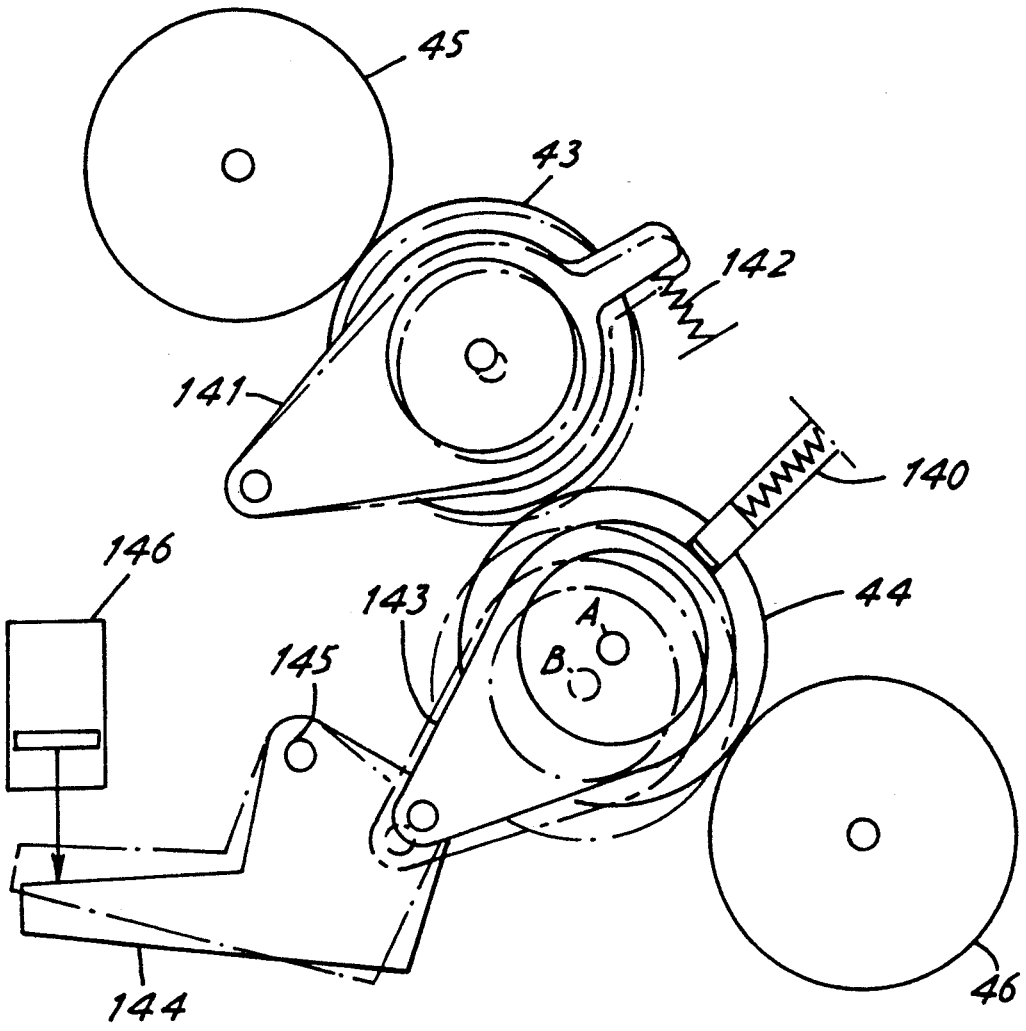
FIG. 10 shows a detail of the cylinder movement system of the press of FIGS. 4 or 7, 8 and 9, illustrating an embodiment of the third aspect of the present invention.

One embodiment of the system for moving the blanket cylinders 43, 44 into and out of contact with the web and their adjacent cylinders is shown in FIG. 10. The solid lines represent the position of the cylinders when they are printing, the dotted lines when they are not. One blanket cylinder 44 is pressed into contact with its associated plate cylinder 46, with the gears 79, 80 in FIG. 5 engaged, and also bears against the other blanket cylinder 43 (the web being then nipped between the blanket cylinders 43 and 44 to ensure good contact for printing). The blanket cylinder 43 then bears against its plate cylinder 45. Normally, a slight freedom is provided in the mounting of the blanket cylinders 43, 44, so that when blanket cylinder 44 is pressed into contact with its adjacent cylinders, both cylinders will automatically position themselves into their precise printing positions by the reactions of the contact pressures to their associated plate cylinders and their co-acting blanket cylinder.

To engage the blanket cylinders 43, 44 one of them (cylinder 44 in FIG. 10) is movable so that its axis moves between positions B and A. This may be achieved, e.g. by mounting the end so the support on which the cylinder rests in a slot, with one end of the slot corresponding to cylinder axis in position B and the other formed in such a way as to allow the cylinder axis to have freedom from the slot sides when in position A. The cylinder axis is pressed into position B by a loaded plunger 140 when printing is not taking place, so that blanket cylinder 44 is in the position shown in dotted lines, and is also out of contact with its corresponding plate cylinder 46 and the other blanket cylinder 43.

The other blanket cylinder 43 is carried on a pivoted support 141 which allows the cylinder axis to move along a restricted arc within an oversize hole (not shown). The boundary of this hole does not influence the axis position when the blanket cylinder 43 is in contact with plate cylinder 45 but does restrict the amount of movement away from the plate cylinder. This permits a gap to open between blanket cylinder 43 and plate cylinder 45 as blanket cylinder 44 moves to position B and also a gap between blanket cylinder 43 and 44 by cylinder 43 being able to follow cylinder 44 but not far enough to maintain contact with it. A similar effect can also be achieved by mounting the support of the blanket cylinder 43 in a slot arranged to allow contact with plate cylinder 45 but restrict movement away from it. If nothing holds the cylinder 43 in contact with plate cylinder 45 it moves away on its pivoted support 141 under a separating force which may be provided by gravity. It is required that the separating force should not exceed a threshold value. If the gravitational (or other) force on the roll 43 exceeds this value, the separating force is reduced by means of a spring 142 or other biasing means such as an air cylinder acting on the pivoted support 141.

As shown in FIG. 10, the blanket cylinder 44 is also mounted on a bracket 143 which is connected to a lever 144 pivoting at point 145. When lever 144 is moved, e.g. by a pneumatic system 146, to the position shown in solid lines, a force is applied to blanket cylinder 44 which moves its axis against the pressure of plunger 140 away from position B towards position A (i.e. the printing position). The blanket cylinder 44 abuts its plate cylinder 46, and also contacts the other blanket cylinder 43, moving it to contact the other plate cylinder 45. The precise positioning and pressure achieved is finally determined by the reactions of the blanket cylinders to their adjacent cylinders and the controlled forces moving them into position (and no longer by the influence of their mounting slots or holes).

Thus, by providing means for moving one of the cylinders into and out of a printing position, and means for the other cylinder to follow over a restricted distance controlled by force reactions, at the "on" position and slot or hole limits at the "off" position, printing may be disengaged and re-engaged quickly and simply, even after a different cartridge has been installed in the press. That is to say, the system provides force loading and self-setting. Ideally the cylinder should run on a continuous surface, and this is best achieved by cylinder bearers (to be discussed later).

The printing machines discussed with reference to FIGS. 4 to 10 thus generally permit printing to occur continuously, but also permit changes of cartridges to be made with quick and easy establishment of the precise settings required. This is very important in minimising down-time. The arrangement shown in FIG. 4 is particularly applicable to single colour (including black) printing. It is also applicable to colour printing although then difficulties may occur in having common inking and dampening trains, and a large number of cartridges and inking and dampening trains may become necessary.

Figure 11:
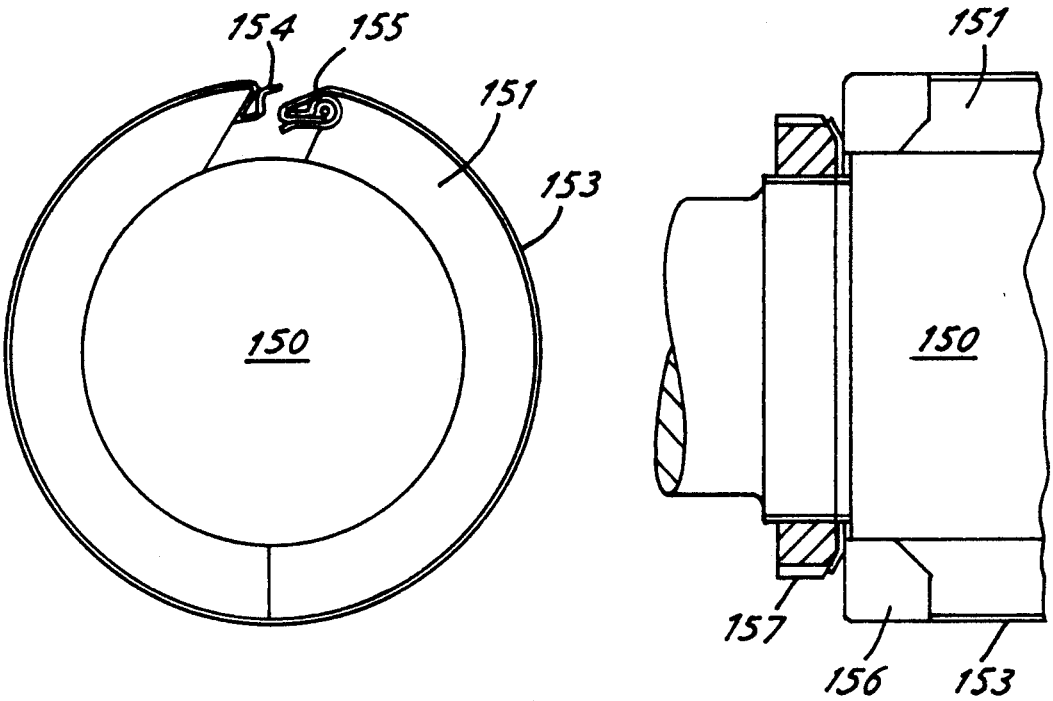
FIGS. 11 and 12 each show axial and radial views of a cylinder with adjustable diameter.
Figure 12:
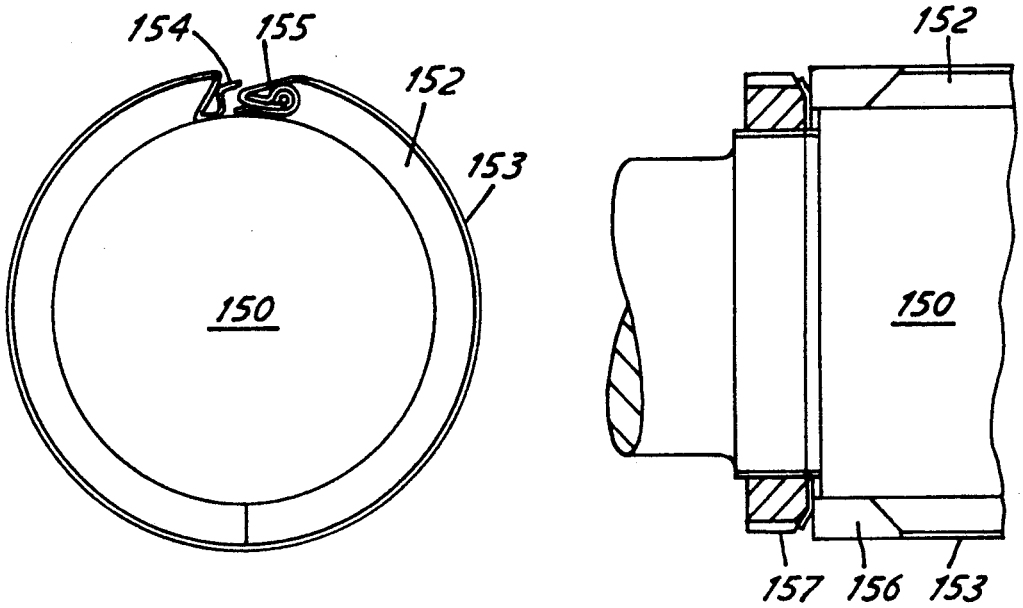

FIGS. 11 and 12 illustrate a design of cylinder which is particularly useful in the present invention. Each cylinder has a core 150 of a given size to which rim units of differing thicknesses may be fitted, as desired. FIG. 11 shows a cylinder with a relatively thick rim unit 151 and FIG. 12 shows a cylinder with a relatively thin rim unit 152. By interchanging the rim units the effective diameter of the cylinder can be changed, without removing the core 150 from the press. The rim units 151, 152 are anti-corrosive (acid gum in the damping fluid may otherwise cause corrosion) and removal of the rim units also allows easy maintenance.

As shown in FIGS. 11 and 12, the rim unit 151, 152 supports a printing plate 153, connected to it by clips 154, 155 which enable the printing plate 153 to be stretched around the cylinder. FIGS. 11 and 12 also show the end rings 156 and clamps 157 at the end of the cylinder for holding the rim unit 151, 152 onto the core 150. The rings 156 act as bearers to ensure smooth rotation of the cylinders, as has been mentioned previously. Note that the rings 156 are slightly thicker than the rim units 151, 152, so that their radially outer surface corresponds exactly with the outer surface of the printing plate 153.

Once the paper web has been printed, then another aspect of the invention comes into play. In most cases, the possibilities for folding of paper whilst in web form are limited (although one or more longitudinal folds may be made as will be described later), but few complicated folding combinations are practicable with the output from web printing machines. On the other hand, there are various techniques for folding paper sheets in e.g. gate folds, multiple transverse folds and longitudinal folds; two are ilustrated in FIGS. 13 and 14.

Figure 13:
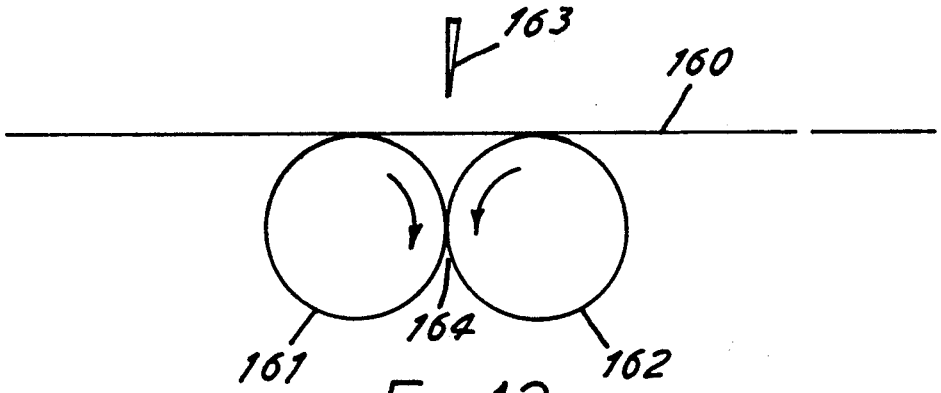
FIGS. 13 and 14 show alternative paper folding systems.

FIG. 13 shows an arrangement known as a knife fold in which the paper sheet 160 passes over a pair of contrarotating rollers 161, 162. With the sheet 160 stationary in that position, a knife 163 is lowered, forcing the sheet 160 into the "nip" 164, thereby providing a firm fold. The sheet 160 is then drawn down between the rollers 161, 162 for subsequent use. The knife 163 will normally be connected to a photocell or similar detector which detects the presence of sheet 160 below the knife. In this way the folding operation can by synchronised with the arrival of the paper sheet 160 at the folder, rather than synchronised with e.g. an earlier stage of the printing operation.

Figure 14:
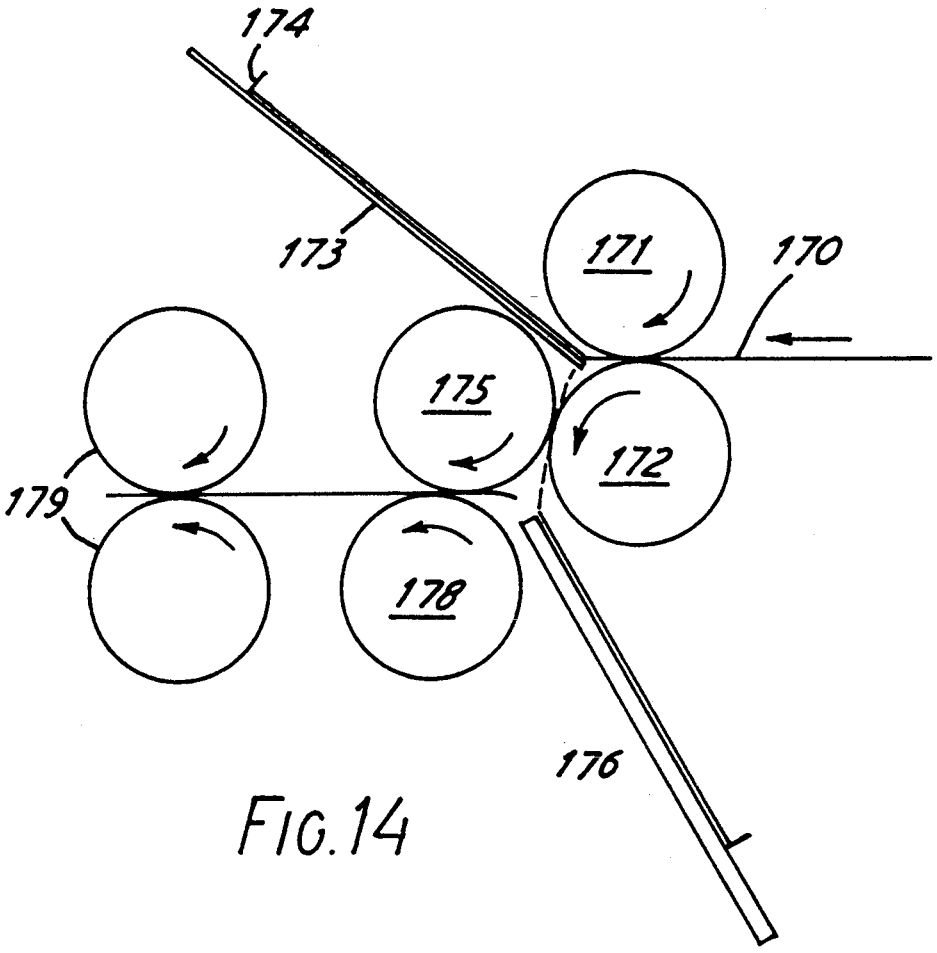

FIG. 14 shows an arrangement known as a buckle folder in which a sheet of paper 170 passes between a first pair of contra-rotating rollers 171, 172 and its leading edge strikes a ramp 173. The action of the rollers 171, 172 forces the paper sheet 170 up the ramp 173, until its leading edge strikes a stop 174, the position of which is determined by the desired position of fold. When paper strikes the stop 174, it can no longer move up the ramp, and so the action of rollers 171, 172 is force the paper sheet 170 into the nip defined between roller 172 and another roller 175. This forms a sharp fold in the paper, which then passes downwardly due to the action of rollers 172 and 175. It may then strike another ramp 176 and move downwardly to another stop 177. In this position the sheet 170 is then acted on by rollers 175 and 178, between which is another nip causing further folding. It is also possible to perforate the folder paper longitudinally by passing it through a perforating nip formed by rollers 179. Thus, the system in FIG. 14 permits successive transverse folding and perforating of the sheet, and by providing several such units with one or two ramps, any number of transverse folds may be provided. If the direction of movement of the sheet is changed between one buckle folder and the next, both longitudinal and transverse folds may be provided. However, the first fold is generally a transverse one, or extra equipment would be needed. Again the folding of the sheet 170 is in timed dependence on its arrival at the folder, not in dependence of the timing of the printing operation.

It is also possible to provide folders which are a combination of knife and buckle folders.

Figure 15:
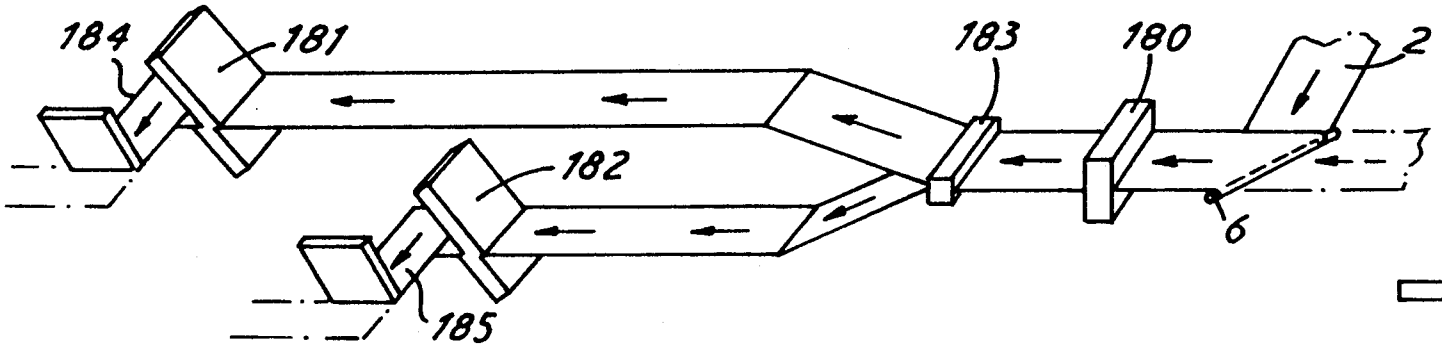
FIG. 15 shows one form of processing and folding paper from a web printing machine, embodying the fourth aspect of the present invention.
Figure 16:
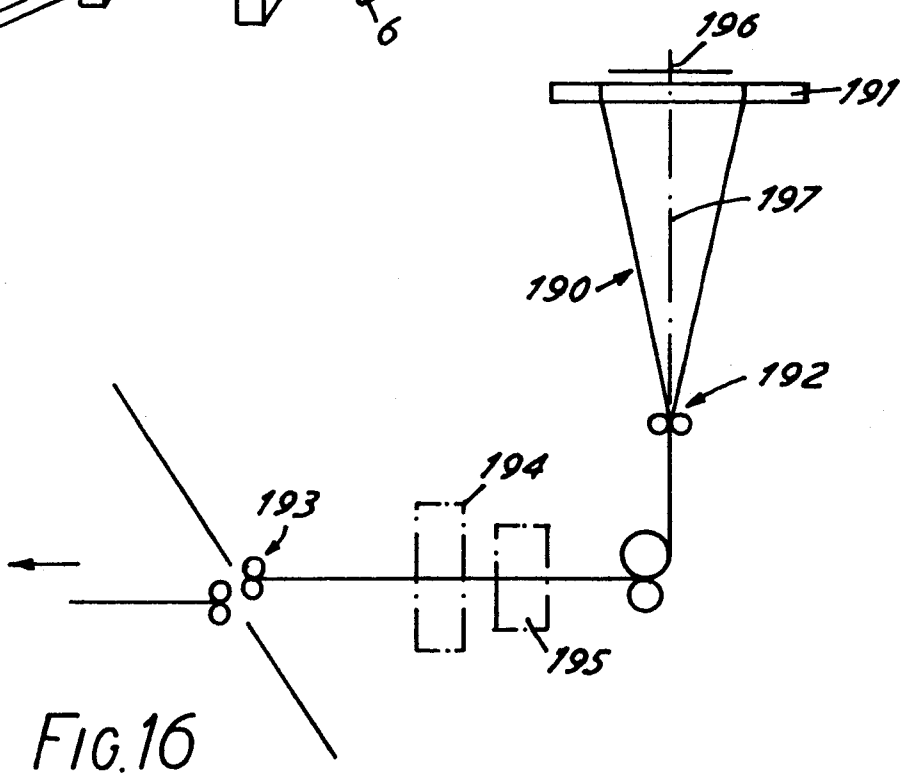
FIG. 16 shows an alternative paper processing arrangement.

Referring now to FIGS. 15 and 16, a paper web 2 from a web printing machine (e.g. as in FIG. 4) is cut into sheets by a knife arrangement 180. FIG. 15 shows a perspective view of the arrangement, and the web 2 from the printing machine is first turned through 90° by a bar 6 as has already been described with reference to FIG. 1. Of course, this is not essential and the web path to the knife arrangement 180 may be straight as shown by dotted lines in FIG. 15. This knife unit 180 may be powered from a drive shaft common with the printing station, as described with reference to FIG. 6, i.e. the knife unit 180 shown in FIGS. 15 and 16 corresponding to the element 91 in FIG. 6. A drier unit may also be provided as discussed with reference to FIG. 1. Once the knife arrangement 180 has cut the web 2 into sheets, they may be passed to a folder 181 which may be e.g. a buckle folder such as shown in FIG. 14, although a knife folder as shown in FIG. 13 may also be used. One factor to bear in mind is that the speed of the web from the printing machine may be faster than can be handled by the known sheet folding systems, and it may be necessary to divide the sheet flow so that sub-streams follow two or more routes. In this example a divider 183 is provided so that some sheets pass straight on to the folder 181, and others are diverted to another folder 182. Further changes in direction may occur at units 184 and 185. Such two-route handling of paper sheets is known, and therefore it is unnecessary to discuss it in greater detail here. Clearly, it is possible to provide for any number of folds, depending on the use to which the paper is to be put.

Whereas, as explained above, the first fold is generally a transverse fold in sheet fed systems. FIG. 16 shows a simple way of providing a first, longitudinal, fold in the paper. This is particularly important with thin paper which cannot easily be handled by buckle folders such as shown in FIG. 14. The paper web 2 from the printer machine and (possibly) the drier passes to a former 190 which is triangularly shaped so that a longitudinal fold is placed in the paper as it moves downwardly from a roller 191 to a pair of guide rollers 192, between which a throat is formed. Thus, the paper fed to a buckle folder generally indicated at 193 has already been folded once, in the longitudinal direction, and is therefore less subject to malfunctioning in the folder. Again, however, a knife or similar cutter 194 has to be provided before the web enters the buckle folder 193.

As described above, the folds are made directly to the paper. However, to ease the transverse folding, a transverse perforating unit 195 may be provided upstream of the knife or other cutter 194. Furthermore, the use of a web printer permits longitudinal perforation to facilitate the longitudinal folding shown in FIG. 16, by means of the continuous perforating wheel 196 producing perforations 197. Furthermore, this wheel 196 may be powered from the main drive shaft to the printing station, as was described with reference to FIG. 6. Likewise, any other longitudinal fold can be produced on a continuous basis. Perforation also assists quality by permitting air to escape from within the fold.

What is claimed is:

1. A web-fed printing apparatus for printing a web, said apparatus comprising:

at least one unit for containing printing medium;

a plurality of cartridges, arranged so as to define an array, for individually and selectively interacting with said at least one unit to print said web when said web is passed through said array of cartridges; each of said cartridges including transferring means for transferring said printing medium from said at least one unit to said web to print the web; and drive means for moving said at least one unit relative to said array of cartridges from a first position in which said at least one unit interacts with a first one of said cartridges to a second position in which said at least one unit interacts with a second one of said cartridges, thereby to enable relative movement therebetween to thus permit successive interaction of said at least one unit with the first and second cartridges, *said cartridges being fixed and said at least one unit being movable to provide said relative movement.*

2. A printing apparatus according to claim 1, [herein] herein wsaid at least one unit includes an inking source.

3. A printing apparatus according to claim 2, wherein said at least one unit comprises a combined inking and dampening unit.

4. A printing apparatus according to claim 1, wherein each of said cartridges is detachable from adjacent cartridges in said array.

5. A printing apparatus according to claim 1, comprising two of said units for containing printing medium, said units being disposed on opposite sides of said array, and each of said cartridges including two of said transferring means positioned such that said web is feedable therebetween, each of said two transferring means interacting with a corresponding one of said units to transfer said printing medium.

6. A printing apparatus according to claim 5 comprising means for interconnecting said two units so as to provide synchronization of the movement of said units relative to said array.

7. A printing apparatus according to claim 1, wherein each said means for transferring printing medium includes at least one printing cylinder.

8. A printing apparatus according to claim 1, wherein each said means for transferring printing medium comprises a plate cylinder for interacting with said unit and a blanket cylinder for contacting the plate cylinder so as to enable the printing medium to be transferred from said unit to the plate cylinder, from the plate cylinder to the blanket cylinder, and from the blanket cylinder to said web.

9. A printing apparatus according to claim 8, comprising two of said units for containing printing medium, said two units being disposed on opposite sides of said array, each of said cartridges including two of said transferring means positioned such that said web is feedable therebetween, each of said two transferring means interacting with a corresponding one of said units to transfer said printing medium, and each of said cartridges including means for controlling movement of the blanket cylinders between a printing position and a withdrawn position relative to the web.

[10. A printing apparatus according to claim 1, wherein said cartridges are fixed and said at least one unit is movable to provide said relative movement.]

[11. A printing apparatus according to claim 1, wherein said at least one unit is fixed and said cartridges are movable to provide said relative movement.]

[12. A printing apparatus according to claim 11, wherein the web is movable in a predetermined direction, and said cartridges are movable in said predetermined direction.]

[13. A printing apparatus according to claim 11, wherein the web is movable in a predetermined direction, and said cartridges are movable in a direction transverse to said predetermined direction.]

[14. A printing apparatus according to claim 11, wherein said cartridges form a rotatable carousel.]

15. A web-fed printing apparatus for printing a web, said apparatus comprising:

at least one unit for containing printing medium; and a plurality of cartridges, arranged to define an array, for printing said web when said web is passed through *each cartridge of* said array; each of said cartridges including transferring means for transferring medium from said at least one unit to said web, said transferring means comprising at least one printing cylinder for contacting said web; the at least one printing cylinder of one of said cartridges having a *substantially* different circumference *from* that *of* the at least one printing cylinder of another one of said cartridges *so that said at least one printing cylinder of said one cartridge provides printing of a different print length from that provided by said at least one printing cylinder of said another cartridge.*

16. A printing apparatus according to claim 15, wherein said at least one printing cylinder comprises a blanket cylinder, wherein each cartridge includes two blanket cylinders and two plate cylinders, and wherein there are at least two said units for containing printing medium, said at least two units comprising at least one unit disposed on one side of the array for interacting with said plate cylinders on said one side of the array, and at least one unit disposed on an opposite side of the array from said one side for interacting with said plate cylinders on said opposite side of the array.

17. A printing apparatus according to claim 16, wherein each of said cartridges includes means for controlling movement of the blanket cylinders between a first, printing position and a second, withdrawn position, relative to the web.

18. A printing apparatus according to claim 15, wherein said at least one unit includes an inking source.

19. A printing apparatus according to claim 18, wherein said at least one unit comprising a combined inking and a dampening unit.

20. A printing apparatus according to claim 15, wherein each of said cartridges is detachable from adjacent cartridges in said array.

21. A web fed printing apparatus for printing a web, said apparatus comprising:

at least one unit for containing printing medium;

a plurality of cartridges, arranged so as to define an array, for individually and selectively interacting with said at least one unit to print said web when said web is passed through *each cartridge of* said array of cartridges, each said cartridge including at least two cylinders disposed such that the web passes between said at least two cylinders *of each cartridge* when said web is passed through said array of cartridges, said cartridges comprising transferring means, including at least one cylinder of said at least two cylinders, for transferring said printing medium from said at least one unit to said web to print the web; and means for mounting said at least one unit and said array of cartridges so as to enable relative movement therebetween to thereby permit successive interaction of said at least one unit with the plurality of cartridges, *said apparatus comprising two of said units for containing printing medium, said units being disposed on opposite sides of said array, each of said cartridges including two of said transferring means positioned so that the web is feedable therebetween, each of said two transferring means including a corresponding one of said at least two cylinders and interacting with a corresponding one of said units to transfer said printing medium.*

22. A web fed printing apparatus according to claim 21, wherein said at least one unit comprises a combined inking and dampening unit.

[23. A web fed printing apparatus according to claim 21, comprising two of said units for containing printing medium, said units being disposed on opposite sides of said array, each of said cartridges including two of said transferring means positioned so that the web is feedable therebetween, each of said two transferring means including a corresponding one of said at least two cylinders and interacting with a corresponding one of said units to transfer said printing medium.]

24. A printing apparatus according to claim [23] *21* comprising means for interconnecting said two units so as to provide synchronization of the movement of said units relative to said array.

25. A printing apparatus according to claim [23] *21* wherein said one cylinder of said at least two cylinders in each of said two transferring means comprises a blanket cylinder, and each of said transferring means also includes a plate cylinder, so as to enable the printing medium to be transferred from each said unit to the corresponding plate cylinder, from that plate cylinder to the corresponding blanket cylinder, and from that blanket cylinder to the web.

26. A printing apparatus according to claim 21, wherein said cartridges are fixed and said at least one unit is movable to provide said relative movement.

* * * * *